United States Patent [19]
Phillips

[11] Patent Number: 6,122,912
[45] Date of Patent: Sep. 26, 2000

[54] ELECTRO-HYDRAULIC POWER STEERING SYSTEMS HAVING IMPROVED EFFICIENCY

[75] Inventor: Edward H. Phillips, Troy, Mich.

[73] Assignee: Techco Corporation, Southfield, Mich.

[21] Appl. No.: 09/172,835

[22] Filed: Oct. 15, 1998

Related U.S. Application Data

[60] Provisional application No. 60/062,437, Oct. 16, 1997, and provisional application No. 60/073,560, Feb. 3, 1998.

[51] Int. Cl.[7] .................................................. F16D 31/02
[52] U.S. Cl. .............................................. 60/413; 60/431
[58] Field of Search ........................... 60/413, 431, 384; 91/375 R, 375 A

[56] References Cited

U.S. PATENT DOCUMENTS

| | | |
|---|---|---|
| 4,573,319 | 3/1986 | Chichester . |
| 4,651,622 | 3/1987 | Yoshida .............................. 91/375 R X |
| 4,665,695 | 5/1987 | Rau et al. ................................. 60/384 |
| 4,776,165 | 10/1988 | Iino . |
| 4,841,841 | 6/1989 | Redelman et al. ................ 91/375 R X |
| 4,944,201 | 7/1990 | Iino . |
| 4,958,493 | 9/1990 | Schutten et al. ................... 91/375 R X |
| 5,442,956 | 8/1995 | Persson . |
| 5,473,231 | 12/1995 | McLaughlin et al. . |
| 5,504,403 | 4/1996 | McLaughlin . |
| 5,505,275 | 4/1996 | Phillips . |
| 5,517,415 | 5/1996 | Miller et al. . |
| 5,623,409 | 4/1997 | Miller . |
| 5,668,389 | 9/1997 | Jassowski et al. . |
| 5,845,689 | 12/1998 | Egging et al. ........................ 60/431 X |

*Primary Examiner*—Hoang Nguyen
*Attorney, Agent, or Firm*—Gifford, Krass, Groh, Sprinkle, Anderson & Citkowski, P.C.

[57] ABSTRACT

A regenerative power steering system 10 for a vehicle, alternatively operable in an unassisted, straight steering mode, a powered assist mode which provides a powered assist to entry of the vehicle into a turn and an energy regeneration mode which recovers energy while the vehicle exits a turn. The system comprises a motor pump 24 connected to a fluid delivery line 20 and a reservoir structure 76, in turn connected to a closed-center control valve assembly 38 for actuating a power cylinder 18 connected to the vehicle wheels. The pump 24 is connected to the delivery line 20 and the reservoir structure 76 by a four-way crossover valve 30.

18 Claims, 8 Drawing Sheets

ELECTRO-HYDRAULIC POWER STEERING SYSTEMS HAVING IMPROVED EFFICIENCY

CROSS-REFERENCE TO RELATED APPLICATIONS

This application claims priority from Provisional U.S. patent application Ser. No. 60/062,437, entitled "Applied Torque Methods and Apparatus for Controlling Electro-Hydraulic Power Steering Systems", filed Oct. 16, 1997 and Provisional U.S. Patent application Ser. No. 60/073,560, entitled "Regenerative Power Steering System Including Solenoid-Activated Four-Way Cross-Over Valve", filed Feb. 3, 1998.

BACKGROUND OF THE INVENTION

I. Field of the Invention

The present invention relates generally to power steering systems, and more particularly to apparatus for improving the efficiency of electro-hydraulically energized vehicular power steering systems.

II. Description of the Prior Art

A variety of power steering systems are known for providing a powered assist to the steering of a motor vehicle. For example, electro-hydraulic power steering (EHPS) systems typically comprise an electrically driven pump which provides a continuous flow of a pressurized fluid to an open-center control valve having an input shaft. As a torque (representative of the applied steering torque) is applied to the input shaft of the valve, selected ones of a plurality of control orifices comprised in the valve progressively close, thereby impeding the flow of pressurized fluid through the valve and causing fluid pressure within the system to rise. Virtually all of the rising system pressure is then applied to a power cylinder in order to provide steering assist. Unfortunately, the efficiency of pressure matched systems such as this is inherently low, because the energy involved in generating the portion of the pressurized fluid passing through only the control valve, and not through the power cylinder, is lost. This undesirably increases the current draw needed for operation, and in practice has probably limited the usefulness of EHPS systems to mid-sized automobiles, at most.

Indeed, in general, the use of other, conventional power steering systems having a pump driven by the vehicle engine entails a cost in fuel efficiency typically amounting to between about 2½ and 5 percent, usually on the lower end of this cost for relatively larger vehicles. EHPS systems are capable of obviating perhaps 90 percent of this loss in fuel efficiency because they are more nearly matched to the load encountered and because they provide a flow more closely matched to that needed, in comparison to the conventional power steering systems. This savings is appreciable and would, in theory, decrease the cost of operating the vehicle and/or permit the vehicle manufacturer to charge a greater price for the vehicle. In practice, this savings may appear to be somewhat offset by the appreciable maximum current drawn by EHPS systems during parking maneuvers. This last problem tends to limit the use of EHPS systems to smaller vehicles.

Also known in the art are full electric power steering (EPS) systems providing somewhat higher operating efficiency generally and somewhat reduced maximum current draw during parking maneuvers. Typically however, such EPS systems suffer from other practical limitations which also tend to restrict their use to smaller vehicles. Depending upon the form taken by any particular EPS system, these practical limitations include excessive pinion loading and power transmission efficiency problems for column mounted EPS systems and mechanical over-constraint and application related packaging issues with other EPS systems. In addition, because directional application of their assist torque occurs as a "control-by-wire" function, EPS systems must be protected from a condition known in the industry as "auto-steer" (e.g., an unintended steering event). EHPS systems, on the other hand, are free of this issue in that their directional application of their assist torque is determined by control valve means operatively driven by the driver via a steering wheel. Thus, energy is applied to an EHPS system in a non-directionally sensitive manner from unidirectionally driven pumping apparatus.

It would be highly advantageous to have EHPS systems that possess operating efficiencies and maximum current draw during parking maneuvers that are substantially equal to those of the most efficient EPS systems. It would be particularly advantageous to have an EHPS system which had a theoretical hydraulic operating efficiency approaching 100%. It would be additionally advantageous to have a regenerative EHPS system allowing substantial recovery of energy from the pressurized fluid in the system when the host vehicle exits a turn. Finally, it should go without saying that it would also be highly advantageous to have such a system which provided for safe operation of the vehicle during failure of the powered assist provided by the system.

SUMMARY OF THE INVENTION

These and other objects are achieved by highly efficient vehicular EHPS systems which draw substantially less current than is drawn by prior EHPS systems, and achieve a hydraulic efficiency approaching 100%. The power steering systems of the present invention are smoothly yet rapidly switchable between three operating modes: an unassisted, straight steering mode; a powered assist mode, in which the systems provide powered assist to entry of a vehicle into a turn; and an returned energy dissipation mode, which handles energy returned to the EHPS systems while the vehicle exits the turn. The powered assist to turning is provided by a motor pump which supplies a pressurized flow of fluid to a control valve assembly connected to a power cylinder. The motor pump is driven by a motor generator, while the control valve assembly is preferably an under-lapped closed-center valve. The high efficiency of the system arises from the fact that during powered assist to steering, the power cylinder control valve assembly forces all of the pumped fluid to pass through the power cylinder.

In a first EHPS system disclosed below, such returned energy is consumed in a dynamic braking manner via dissipation in a bypass valve. Such energy dissipation is enabled via servo control of the bypass valve such that system pressure is maintained according to pre-selected functions of hand wheel torque and vehicular speed. Whenever the host vehicle is traveling at speed, the stored energy to be returned can be determined by the integral of the steering force with respect to rack displacement. This can be considered as the compression of a virtual spring, which stores energy upon entry of the vehicle into a turn.

In a second EHPS system disclosed below, even greater overall efficiency is achieved via such returned energy being regeneratively directed back to the host vehicle's electrical system. As a consequence of this regenerative operation, it is possible for the second EHPS system to at least partially recover or regenerate energy from the integral of returning forces generated by the dirigible (steerable) wheels of the vehicle during recovery from a turn. Such energy is transferred as power through the power cylinder and back to the motor pump, and thence back to the motor generator.

In the second EHPS system, energy regeneration is enabled by switching the direction of the fluid connection of the motor pump to the power cylinder control valve assembly between the powered assist and energy regeneration modes, for example, by selectively reversing the connection of the outlet and inlet ports of the motor pump to the control valve assembly. Such switching can be rapidly carried out by a solenoid-actuated four-way cross-over valve; this exposes the ports of the motor pump to a change in pressure, and allows the fluid flow in the major portion of the system to reverse while the motor pump operates in only a single direction in either the powered assist and energy regeneration modes. In the straight steering mode, of course, there is no powered assist to steering the vehicle and no energy to be recovered by the motor generator, and the motor pump and motor generator do not rotate at all during the straight steering mode. Moreover, system pressure has a substantially zero value during the straight steering mode. Since a motor vehicle is driven in a straight direction most of the time, this means that the motor pump and motor generator need not rotate most of the time the vehicle is in operation. This is a tremendous contrast and savings in energy costs over prior systems, in which a pump or motor of one sort or another are operated on a continuous basis to supply pressurized fluid.

In the powered assist mode of the second EHPS system, the four-way cross-over valve connects the motor pump outlet port to a line, referred as a fluid delivery line, fluidly connected to a pressure port of the power cylinder control valve assembly, and connects the motor pump inlet port to a reservoir structure. The reservoir structure comprises a fluid return line fluidly connected to a reservoir port of the power cylinder control valve assembly and a fluid reservoir. During the energy regeneration mode the four-way cross-over valve connects the motor pump inlet port to the fluid delivery line and motor pump outlet port to the reservoir structure. In general, the fluid in the fluid delivery line is always maintained at higher pressure than the fluid in the reservoir structure as determined by the steering force generated by the power cylinder. The system uses the polarity of the difference between generated signals representative of the torque applied by the motor generator to the motor pump, and of the fluid pressure in the fluid delivery line, to determine the actual operating state of the system, and to switch the system to the appropriate operating mode.

For smoothness of operation, it would of course be desirable to activate the four-way cross-over valve for switching between the powered assist and energy regeneration modes at zero motor pump speed. In general, this does occur during steering direction reversals after entry into a turn. However, upon rapid reversed motion of the hand wheel through center, with resulting transition from energy regeneration to powered assist modes (i.e., with powered assist applied in the opposite direction), the motor pump speed is elevated during switching as determined by hand wheel speed. During such rapid transition events, the crossover valve is activated to its powered assist configuration slightly in advance of the actual time of transition. This provides for the necessary fluid acceleration associated with reversal of fluid flow in the fluid delivery and reservoir lines.

In a first aspect, then, the present invention is broadly directed to an efficient power steering system for a vehicle, alternatively operable in an unassisted, straight steering mode, a powered assist mode which provides a powered assist to entry of the vehicle into a turn and a returned energy dissipation mode wherein returning stored energy is dissipated while the vehicle exits a turn, the system employing a fluid; wherein the system comprises a power cylinder, a motor pump supplying a flow of pressurized fluid to the power cylinder during the powered assist mode of the system, and a bypass valve operatively connected to the power cylinder so as to dissipate stored energy recovered from the power cylinder during the returned energy dissipation mode of the system; and wherein the motor pump and the motor generator do not rotate during the straight steering mode of the system.

In a second aspect, the present invention is broadly directed to a regenerative power steering system for a vehicle, alternatively operable in an unassisted, straight steering mode, a powered assist mode which provides a powered assist to entry of the vehicle into a turn and an energy regeneration mode which recovers stored energy while the vehicle exits a turn, the system employing a fluid; wherein the system comprises a power cylinder, a motor pump supplying a flow of pressurized fluid to the power cylinder during the powered assist mode of the system, and a motor generator operatively connected to the motor pump so as to generate energy recovered from the motor pump during the energy regeneration mode of the system; and wherein the motor pump and the motor generator do not rotate during the straight steering mode of the system.

In a third aspect, the present invention is directed to a regenerative power steering system for a vehicle, alternatively operable in an unassisted, straight steering mode, a powered assist mode which provides a powered assist to entry of the vehicle into a turn and an energy regeneration mode which recovers stored energy while the vehicle exits a turn; wherein the system employs a fluid, and wherein the system comprises: a power cylinder; a power cylinder control valve assembly fluidly connected to and controlling actuation of the power cylinder; a fluid delivery line fluidly connected to the power cylinder control valve assembly; a reservoir structure fluidly connected to the power cylinder control valve assembly; a motor pump having an outlet port and an inlet port; means for switching the system between the straight steering, powered assist and energy regeneration modes, comprising a four-way cross-over valve operable between: (a) a first position associated with the powered assist mode of the system, in which the four-way cross-over valve fluidly connects the motor pump outlet port to the fluid delivery line and fluidly connects the motor pump inlet port to the reservoir structure; and (b) a second position associated with the energy regeneration mode of the system, in which the four-way cross-over valve fluidly connects the motor pump outlet port to the reservoir structure and fluidly connects the motor pump inlet port to the fluid delivery line; and a motor generator operatively connected to the motor pump, the motor generator driving the motor pump so as to provide a flow of pressurized fluid to the power cylinder control valve assembly and the power cylinder during the powered assist mode of the system, and the motor generator generating energy recovered through the motor pump during the energy regeneration mode of the system.

Preferably, the second EHPS system further comprises a means for storing and delivering electrical power, such as a battery and alternator, and an electronic control means for coordinating (a) movement of the four-way cross-over valve between its first and second positions and (b) connection of the motor generator to the electrical power storing and delivering means, in a manner so that electrical power is delivered from the electrical power means to the motor generator during the powered assist mode of the system, and is stored to the electrical power means by the motor generator during the energy regeneration mode of the system. The switching means also preferably comprises a centering, push-pull, double actuated solenoid operatively connected to the four-way cross-over valve.

The power steering system of the present invention preferably generates signals representative of the torque applied by the motor generator to the motor pump and the fluid pressure in the fluid delivery line. The electronic control means then actuates the switching means (for example, by actuating the solenoid) in response to the polarity of the difference between the signals representative of the torque applied by the motor generator to the motor pump and the fluid pressure in the fluid delivery line.

The reservoir structure of the system preferably includes a fluid reservoir, a fluid return line fluidly connecting the power cylinder control valve assembly to the fluid reservoir, a suction line fluidly connecting the four-way cross-over valve to the fluid reservoir and a check valve disposed in parallel with the suction line, and bypassing the cross-over valve, directly to the motor pump inlet port, the check valve being oriented so as to prevent cavitation of the motor pump during the powered assist mode. The system then preferably further comprises a check valve fluidly connected to the fluid delivery line and the fluid return line and disposed in parallel with the power cylinder control valve assembly, the check valve being closed when the pressure of the fluid in the fluid delivery line is greater than the pressure of the fluid in the fluid return line, and being open during transient events when the reverse is true, thereby preventing cavitation in the fluid delivery line upon abrupt actuation of the power cylinder by the dirigible wheels such as when impacting a chuck hole or the like.

The power cylinder control valve assembly and the four-way cross-over valve are preferably configured as underlapped, closed-center four-way cross-over valves, each having a neutral center position and a pair of extreme positions. "Underlapped" is a term well-known in the art to indicate a valve which leaks when centered in a neutral position, so as to fluidly connect (at least, to some degree) all of the elements separately connected by the valve in its extreme positions.

It is a characterizing feature of the second EHPS system of the present invention that the motor pump rotates in the same direction during at least substantial portions of both the powered assist and energy regeneration modes of the system, that is, well over a majority of the time that the motor pump has a non-zero rotational speed. Preferably, the motor pump rotates in only a single direction virtually all the time it operates in either the powered assist or the energy regeneration mode, preferably having its speed reduced to zero whenever the hand wheel speed is zero. Of course, since the predominant mode of operating a motor vehicle is driving it in a straight line with no applied steering torque (and no unrecovered energy in the system), the motor pump and motor generator will not rotate during the great majority of the time the vehicle is operated, that is, during the unassisted, straight steering mode of the system.

In a fourth aspect, the present invention is directed to a particularly preferred combination of the elements of the third aspect of the invention. More particularly, in this fourth aspect, the present invention is directed to a regenerative power steering system for a vehicle, alternatively operable in an unassisted, straight steering mode, a powered assist mode which provides a powered assist to entry of the vehicle into a turn and an energy regeneration mode which recovers stored energy while the vehicle exits a turn; wherein the system employs a fluid, and wherein the system comprises: a power cylinder; an underlapped, closed-centered, four-way power cylinder control valve assembly fluidly connected to and controlling actuation of the power cylinder; a fluid delivery line fluidly connected to the power cylinder control valve assembly; a reservoir structure fluidly connected to the power cylinder control valve assembly; a motor pump having an outlet port and an inlet port; means for switching the system between the straight steering, powered assist and energy regeneration modes, comprising a four-way cross-over valve and a centering, push-pull, double actuated solenoid operatively connected to the four-way cross-over valve, such that the four-way cross-over valve is operable between: (a) a first position associated with the powered assist mode of the system, in which the four-way cross-over valve fluidly connects the motor pump outlet port to the fluid delivery line and fluidly connects the motor pump inlet port to the reservoir structure; and (b) a second position associated with the energy regeneration mode of the system, in which the four-way cross-over valve fluidly connects the motor pump outlet port to the reservoir structure and fluidly connects the motor pump inlet port to the fluid delivery line; a motor generator operatively connected to the motor pump, the motor generator driving the motor pump so as to provide a flow of pressurized fluid to the power cylinder control valve assembly and the power cylinder during the powered assist mode of the system, and the motor generator generating energy recovered through the motor pump during the power regeneration mode of the system, the system generating signals representative of the torque applied by the motor generator to the motor pump and of the fluid pressure in the fluid delivery line; a means for storing and delivering electrical energy; and an electronic control means for: (i) coordinating both (a) movement of the four-way cross-over valve between its first and second positions, and (b) connection of the motor generator to the electrical energy storing and delivering means, in a manner so that electrical energy is delivered from the electrical energy means to the motor generator during the powered assist mode of the system, and is stored to the electrical energy means by the motor generator during the energy regeneration mode of the system; and (ii) for actuating the solenoid in response to the polarity of the difference between the signals representative of the torque applied by the motor generator to the motor pump and the fluid pressure in the fluid delivery line; wherein the motor pump rotates in the same direction during substantial portions of both the powered assist and energy regeneration modes of the system, and wherein the motor pump and the motor generator do not rotate during the straight steering mode of the system; wherein the reservoir structure comprises a fluid reservoir, a fluid return line fluidly connecting the valve assembly to the fluid reservoir, a suction line fluidly connecting the four-way cross-over valve to the fluid reservoir and a check valve disposed in parallel with the suction line and connected directly to the inlet port of the motor pump, oriented so as to prevent cavitation of the motor pump during the powered assist mode; and wherein the system further comprises a check valve fluidly connected to the fluid delivery line and the fluid return line and disposed in parallel with the valve assembly, the check valve being closed when the pressure of the fluid in the fluid delivery line is greater than the pressure of the fluid in the fluid return line and being open when the pressure of the fluid in the fluid return line is greater than the pressure of the fluid in the fluid delivery line, thereby preventing cavitation in the fluid delivery line upon abrupt actuation of the power cylinder by outside influences; wherein the four-way cross-over valve is further operable in a neutral position between its first and second positions, associated with the straight steering mode of the system, in which the four-way cross-over valve fluidly connects all of the motor pump outlet port, the motor pump inlet port, the fluid delivery line and the reservoir structure to one another; and wherein the power cylinder comprises a pair of ports fluidly connectable to the power cylinder control valve assembly for actuation of the power cylinder, and wherein the power cylinder control valve assembly is further operable in a neutral position associated with the straight steering mode of the system, in which the power cylinder control valve assembly fluidly connects all of the fluid delivery line, the reservoir structure and both ports of the power cylinder to one another.

In a final aspect, the present invention is directed to the method of controlling operation of a power steering system as broadly described, for regenerating energy when the host vehicle exits a previously entered turn. More particularly, in this final aspect, the present invention is directed to a method of controlling and regenerating energy in a power steering system for a vehicle, the system being alternatively operable in an unassisted, straight steering mode, a powered assist mode which provides a powered assist to entry of the vehicle into a turn and an energy regeneration mode which recovers energy while the vehicle exits a turn, and the system employing a fluid; wherein the system comprises a power cylinder, a fluid delivery line switchably fluidly connected to the power cylinder, a motor pump supplying a flow of pressurized fluid through the fluid delivery line and to the power cylinder during the powered assist mode of the system, and a motor generator operatively connected to the motor pump so as to generate energy recovered from the motor pump during the energy regeneration mode of the system; and wherein the method comprises the steps of: generating normalized signals representative of the torque applied by the motor generator to the motor pump, and of the fluid pressure in the fluid delivery line; switching operation of the system to the energy regeneration mode when the polarity of the respective difference between the signals is negative; and switching operation of the system to the powered assist mode when the polarity of the respective difference between the signals is positive.

The regenerative power steering systems of the present invention have many advantages over the prior power steering systems. The power steering systems of the present invention draws substantially less current during operation than is drawn by prior EHPS systems. An efficiency of utilizing the fluid flow approaching 100% could not be achieved in prior systems because not all of the pressurized fluid generated by the prior systems flowed through the power cylinder in them; the portion of the energy utilized to pressurize the fluid which directly flowed through their open center valves, thereby bypassing the power cylinder, was wasted. Moreover, the systems of the present invention can be switched rapidly yet smoothly between their operating modes, permitting good steering control both during their respective three modes of operation and when switching between those modes. Of course, the systems of the present invention also provide for safe operation of the vehicle during failure of the powered assist provided by the systems.

BRIEF DESCRIPTION OF THE DRAWING

A better understanding of the present invention will now be had with reference to the accompanying drawing, wherein like reference characters refer to like parts throughout the several views contained herein and in the incorporated provisional application, and in which.

DETAILED DESCRIPTION OF THE PREFERRED EMBODIMENT

Figure 1:
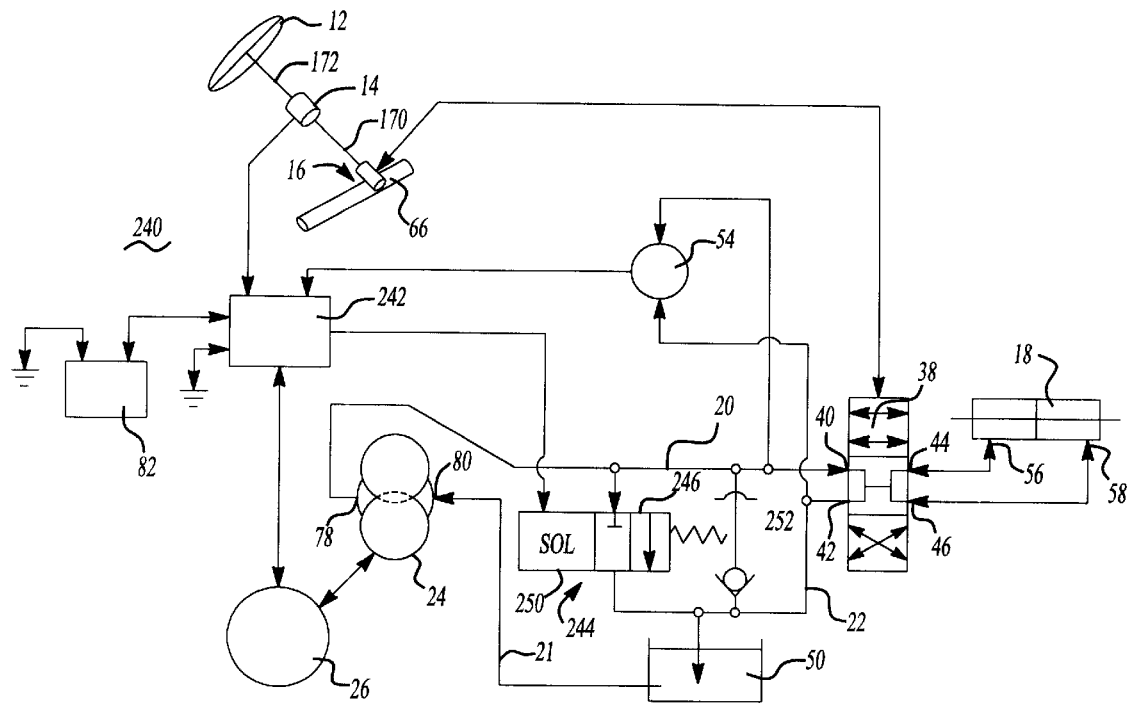
FIG. 1 is a schematic view of the preferred embodiment of the present invention.

With reference to FIG. 1, a high efficiency vehicle power steering system 240 according to a preferred embodiment of the present invention is thereshown schematically, in conjunction with various constituents of the host vehicle in which the system 240 is located. More particularly, the system 240 is employed with a steering wheel 12 movable by a driver for steering the dirigible (steerable) wheels (not shown) of the vehicle. The steering wheel 12 is connected to the dirigible wheels by a steering shaft 172 coupled to a suitable steering gear 16, for example, of the rack-and-pinion type, including a pinion shaft (not shown) contained in a steering gear housing 66 and engaged with a gear rack (also not shown). A torque transducer 14 is connected to the steering gear 16 and generates an electrical or electronic signal representative of the magnitude of the steering torque applied to the steering wheel 12.

The torque transducer 14 can be located anywhere between the steering wheel 12 and the gear rack. The torque transducer 14 could be located in steering shaft 172 as shown, or alternately, within the steering gear 16. The torque transducer 14 may, for instance, be a magnetoelastic based non-compliant torque sensor such as manufactured by VDO Control Systems, Inc. of Cheshire, Conn. Such a device is described in a Philips Automotive Electronics (e.g., the former name of VDO Control Systems, Inc.) paper entitled "Magnetoelastic Based Non-Compliant Torque Sensor for Automotive Steering Applications" by Brian Kilmartin and dated Aug. 14, 1997.

The power steering system 240 of the present invention first comprises a motor pump 24 having an outlet port 78 and an inlet port 80 fluidly connected to a control valve assembly 38. The valve assembly 38 is fluidly connected to and controls actuation of a power cylinder 18. The valve assembly 38 is conveniently positioned within the steering gear housing 66 and is in close operative association with the pinion shaft (not shown). The power cylinder 18 can be of any conventional or convenient construction suited to provide a powered assist to steering the dirigible wheels of the vehicle, and includes left and right ports 56 and 58 which allow selective fluid pressurization of either the left or the right side of the power cylinder 18. The outlet port 78 of the motor pump 24 is connected to the control valve assembly 38 via a fluid delivery line 20 while the inlet port 80 is connected to a reservoir 50 via a suction line 21. The control valve assembly 38 is preferably a four-way underlapped closed-center valve having an inlet port 40 fluidly connected to the fluid delivery line 20 and an outlet port 42 fluidly connected to a fluid return line 22. A differential pressure sensor 54 is fluidly connected between the fluid delivery line 20 and the fluid return line 22 for generating an electrical or electronic signal representative of the fluid pressure difference therebetween, and therefore representative of the net system pressure. The valve assembly is fluidly connected to the left and right ports 56 and 58 of the power cylinder 18 via left and right control ports 44 and 46, respectively. Thus, under static conditions the pressure difference indicated by the differential pressure sensor 54 is substantially equal to the absolute value of the pressure difference between left and right ports 56 and 58 of the power cylinder 18.

During the powered assist mode of the system 240, the control valve assembly 38 selectively fluidly connects the fluid delivery line 20 to the left or right port 56 or 58 of the power cylinder 18 through the left or right control port 44 or 46 of the control valve assembly 38, respectively, depending upon the desired direction of steering assist. During the returned energy dissipation mode of the system 240, the valve assembly 38 continues to connect the fluid delivery line 20 to the same port 56 or 58 to which the fluid delivery line 20 was connected during the powered assist mode of the system 240, even though fluid flow therethrough has been reversed. In this case, the motor pump 24 is slowed and a dynamic braking means 244 is selectively activated to bypass the surplus fluid directly to the reservoir 50 in a manner to be fully explained below.

In FIG. 1, the valve assembly 38 is shown in a neutral position corresponding to the unassisted, straight steering mode. Because the valve assembly 38 is underlapped, in its neutral position it results in fluidly connecting all of the fluid delivery line 20, the reservoir 50 and the left and right ports 56 and 58 of the power cylinder 18 to one another. This enables non-pointing behavior of the system 240 when installed in the host vehicle during the unassisted, straight steering mode. Underlapping of the valve assembly 38 also provides tactile feedback to the vehicle driver during operation of the system 240 in the straight steering mode. The valve assembly 38 would be moved from its neutral position via the application of torque to the steering wheel 12 during the powered assist and returned energy dissipation modes of the system 240, depending upon the directions of vehicle turn and steering wheel motion.

The regenerative power steering system 240 of the present invention next comprises a motor generator 26 operatively connected to the motor pump 24. The motor generator 26 is preferably an induction motor under vector control. The motor generator 26 drives the motor pump 24 during the powered assist mode of the system 240 so as to provide a flow of pressurized fluid to the control valve assembly 38 and the power cylinder 18, thereby enabling a powered assist to steering of the vehicle. Because of the necessity for rapid slowing of the motor pump 24, however, the motor generator 26 is capable of generating power recovered from rapid deceleration of the combined inertia of the rotating elements of the motor pump 24 and the motor generator 26.

The power steering system 240 conveniently comprises a means 82, such as the combination of a conventional vehicle battery and a conventional vehicle engine-driven alternator (not separately shown), which is suitable for delivering electrical power to the motor generator 26 for driving the motor pump 24 during the powered assist mode of the system 240, and which is suitable for storing electrical power generated by the motor generator 26 during rapid deceleration thereof. The electrical power storing and delivering means 82 also supplies the operative power for actuation of a solenoid 250 which is used to activate the dynamic braking means 244.

The system 240 of the present invention preferably comprises an electronic control means 242 which operates various parts of the system 240 in cooperation with one another. For example, the electronic control means 242 preferably coordinates connection of the motor generator 26 to the electrical power storing and delivering means 82. The electronic control means 242 can comprise any suitable structure, for example, an inverter means (not shown) for connecting the motor generator 26 to the electrical power storing and delivering means 82. The electronic control means 242 carries out this coordination in a manner so that electrical power is delivered from the electrical power means 82 to the motor generator 26 during the powered assist mode of the system 240, and regenerative energy is stored to the electrical power means 82 by regenerative power delivered from the motor generator 26 during rapid deceleration of the motor generator 26. Indeed, it is the control of the motor generator 26 that is the primary function of the electronic control means 242.

The system 240 preferably generates signals representative of the torque applied by the motor generator 26 to the motor pump 24, and representative of the fluid pressure difference between the delivery line 20 and the fluid return line 22. The latter of these signals is generated by the pressure sensor 54, while the former can be generated within the electronic control means 242; since the motor generator 26 is an induction motor under vector control, it is possible to separately determine the current values applied to generate field and torque in the motor generator 26.

Whenever a returning flow of fluid is recovered via the delivery line 20 during operation in the recovery mode, that returning flow of fluid is added to any residual flow of pressurized fluid into a delivery line 20 from the motor pump 24 and passed to the return line 22 in a dynamic braking manner by dynamic braking means 244. In the system 240 the motor generator 26 is always operated in the forward motion direction. This includes a standby mode where the motor generator 26 is kept moving at a rotational speed of a few hundred RPM. This is done in order to significantly simplify implementation of the above described control function wherein the surplus flow is bypassed to the fluid return line 22 via the dynamic braking means 244. Thus, there is always at least a residual flow of pressurized fluid issuing from the motor pump 24.

Bypass operation of dynamic braking section 244 is implemented by a pressure balanced bypass valve assembly 246 driven by the solenoid 250. The electronic control means 242 preferably actuates the solenoid 250 in response to the polarity and magnitude of the difference between the signals representative of the torque applied by the motor generator 26 to the motor pump 24 and the fluid pressure difference measured by the pressure sensor 54. This is accomplished in harmony with operation of the motor generator 26 such that pressurized fluid is bypassed only when the signal from the pressure sensor 54 exceeds that representative of the torque applied by the motor generator 26. The electronic control means 242 utilizes the signal from the torque transducer 14 and a signal representative of vehicle speed to determine and effect the instant level of torque applied by the motor generator 26, and thus, the signal representative thereof.

The pressure balanced bypass valve assembly 246 comprises a two-way valve which is spring biased by spring 252 toward a fail-safe open position. Thus, current sufficient to overcome the spring bias must be provided by the electronic control means 242 during the powered assist mode and progressively relaxed in a servo controlled manner during the recovery or straight ahead unassisted steering modes. Whenever this occurs, the pressure balanced bypass valve assembly 246 becomes an electro-hydro-mechanical servo device for controlling system pressure via bypassing fluid from the fluid delivery line 20 to the fluid return line 22.

Figure 2A:
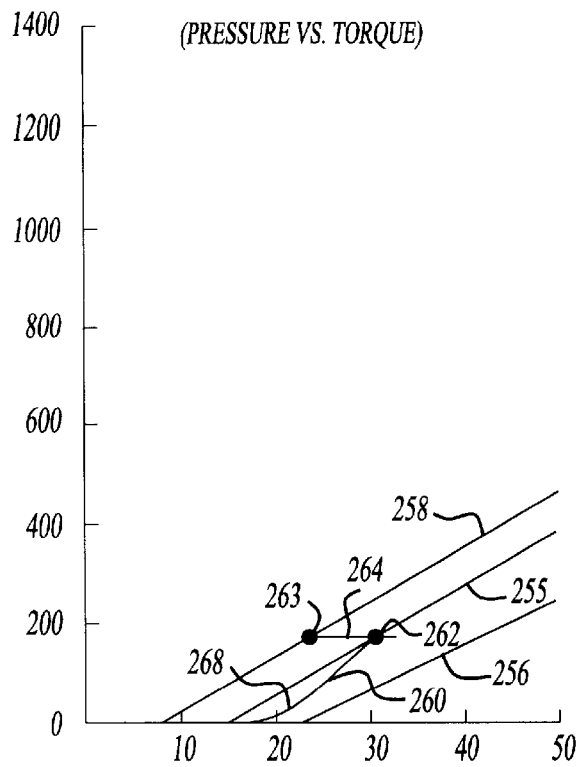
FIGS. 2A, 2B and 2C are graphical diagrams depicting operation of the preferred embodiment of the present invention.

Shown in FIG. 2A is a graphical diagram depicting operation of the power steering system 240 at both low and high motor pump speeds as well as in the recovery mode effected by the pressure balanced bypass valve assembly 246. In FIG. 2A low and high speed motor pump operation is respectively depicted by curves 255 and 256, and recovery operation is depicted by curve 258. When entering a turn, system fluid pressure values progressively increase along a curve 260 generally located between the curves 255 and 256 to a point 262 representative of a static value of steering force required for the turn. While in the turn, the system fluid pressure value is nominally constant but the applied torque value is indeterminate along line 264 between points 262 and 263 located on curves 255 and 258, respectively. When exiting the turn, the system fluid pressure follows curve 258 back toward nominal zero value as the vehicle recovers from the turn. The difference in applied torque values between the curves 255 and 258 represents system hysteresis. As will be recognized by those skilled in the art, this representation of hysteresis values is similar in nature to those commonly seen with open center control valves in prior art EHPS systems.

Figure 2B:
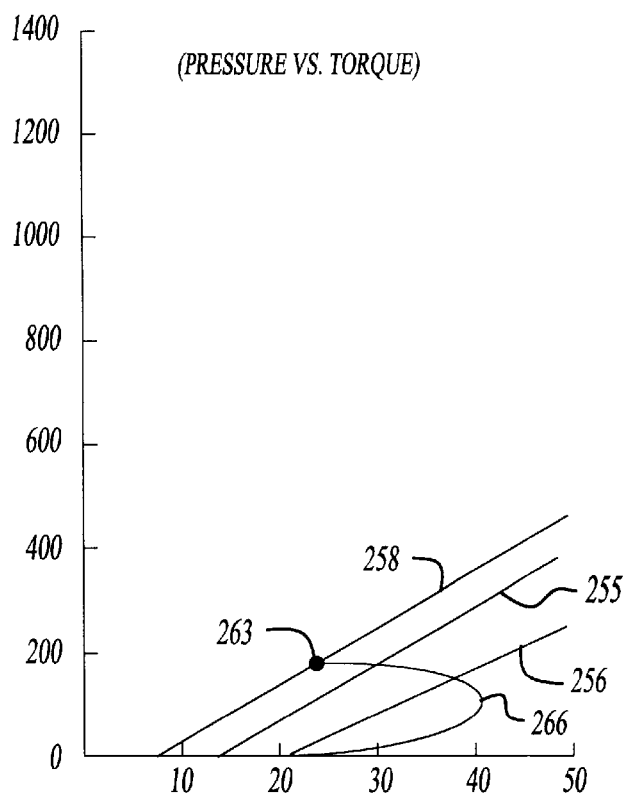

Shown in FIG. 2B is a graphical diagram depicting operation of the power steering system 240 in an accident avoidance maneuver. In this case the accident avoidance maneuvering turn is entered as rapidly as human reactions will allow, and the motor generator 26 must rapidly accelerate and then operate at high speed for the duration of the turning motion of the steering wheel. In order to cause the motor generator 26 to rapidly accelerate in this manner, the first algorithm is driven by a significantly increased applied torque signal value. As depicted by curve 266 in FIG. 2B, the driver must exert extraordinary levels of applied torque to the steering wheel in order to execute such an accident avoidance maneuver. This is entirely compatible with the high adrenaline levels normally present during such occasions and therefore is the safest operational environment because it tends to eliminate over steering and/or steering over corrections. Referring again to FIG. 2A, this effect can even be seen in portion 268 of the curve 260. From an overall tactile standpoint, the power steering system 240 has the ideal feel of a highly damped, mass-loaded control system.

Figure 2C:
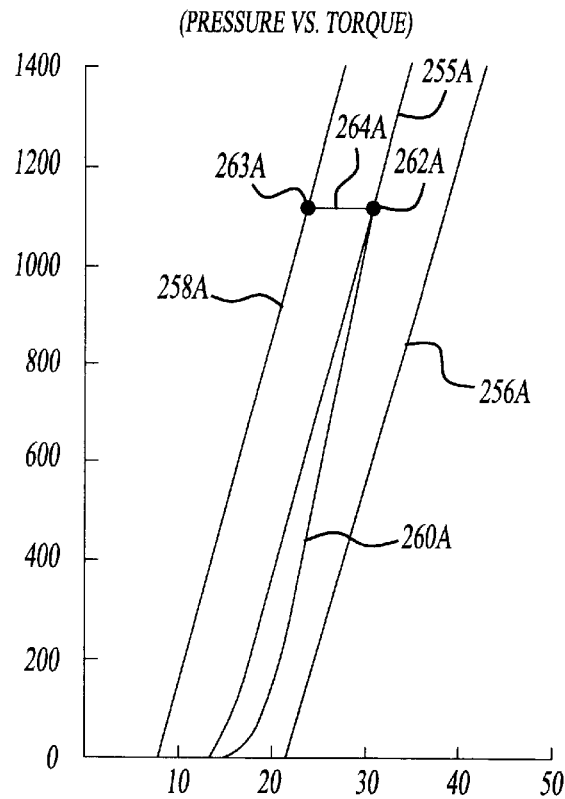
Figure 4:
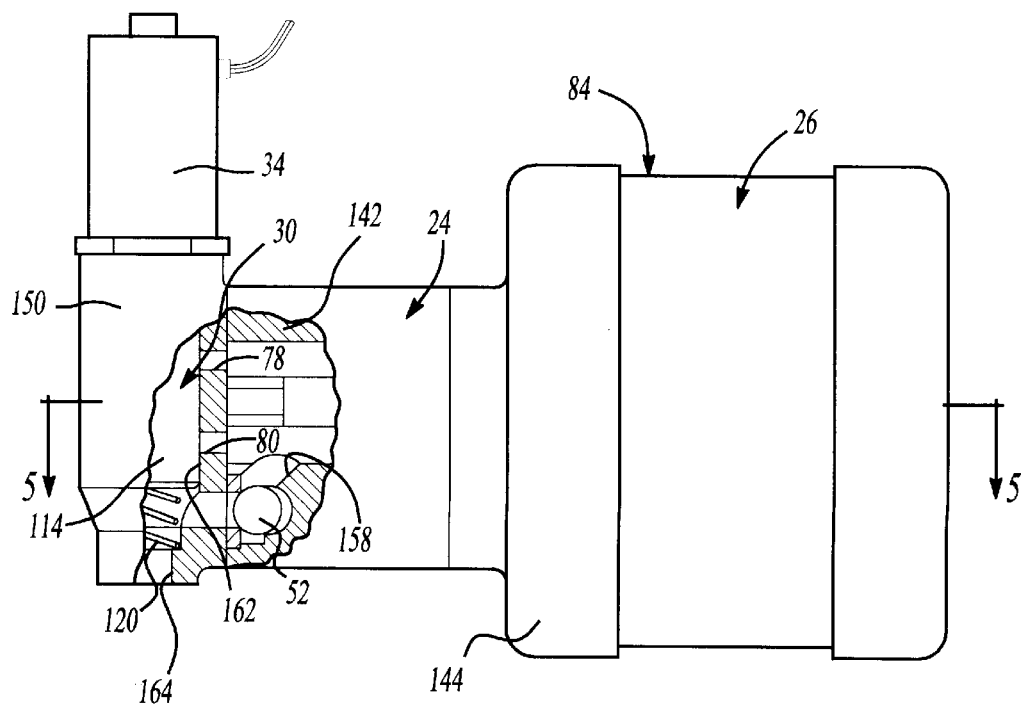
FIG. 4 is a top, partial view of a portion of a second alternate preferred embodiment of the present invention.
Figure 5:
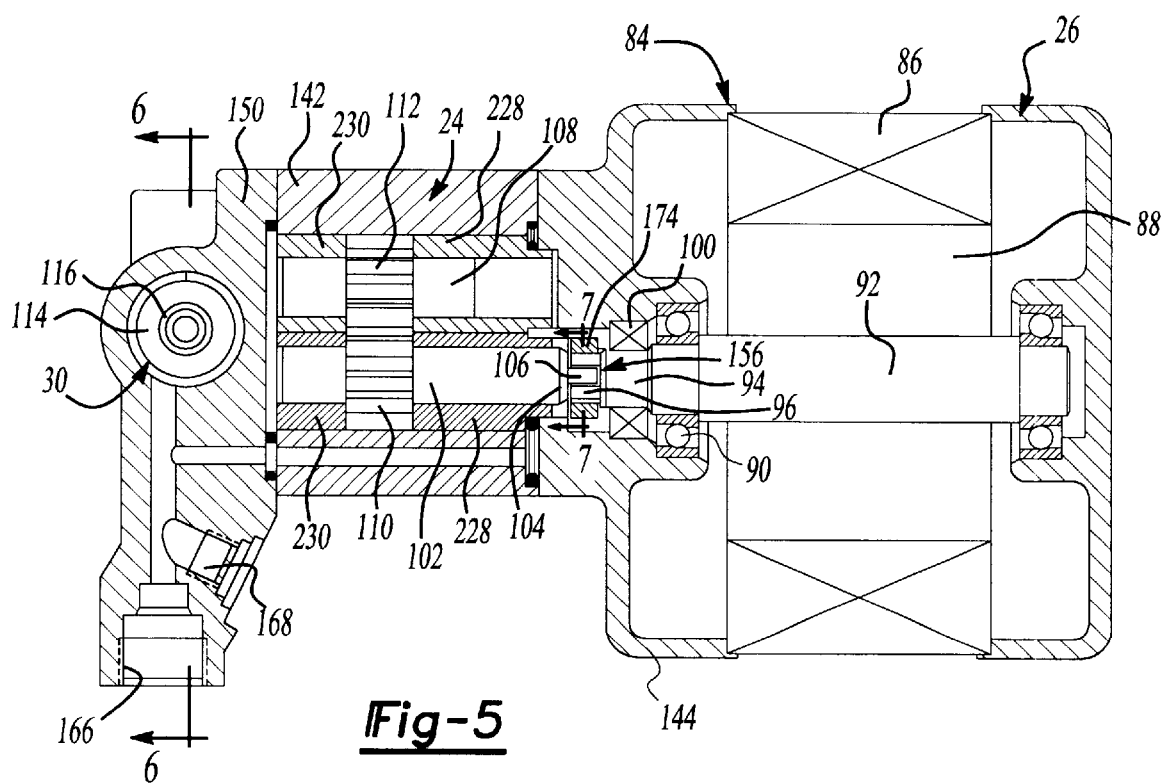
FIG. 5 is a partial cross-sectional view taken along line 5—5 in FIG. 4.
Figure 7:
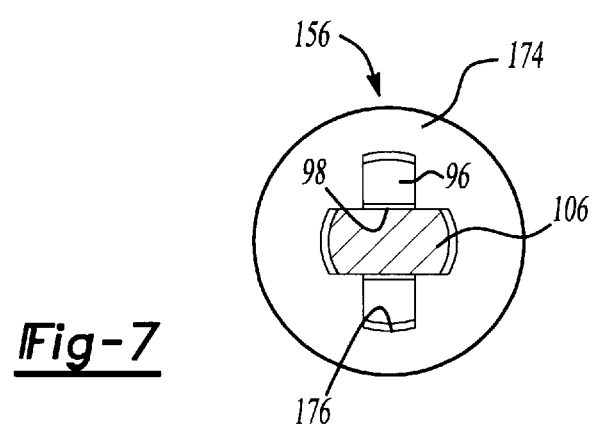
FIG. 7 is a cross-sectional view taken along line 7—7 in FIG. 5.
Figure 6:
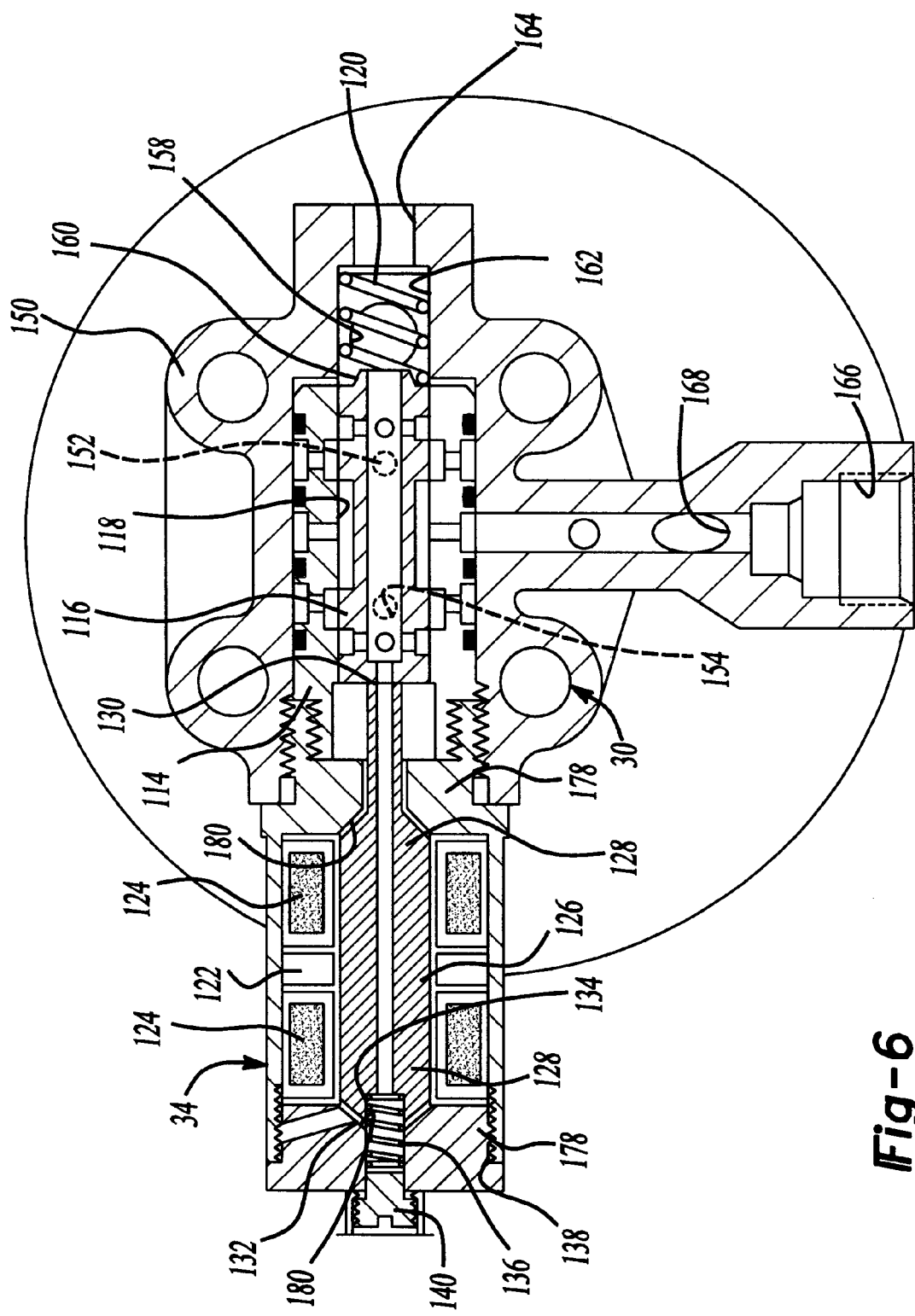
FIG. 6 is a partial cross-sectional view taken along line 6—6 in FIG. 5.

Shown in FIG. 2C is a graphical diagram depicting operation of the power steering system 240 in a low speed (i.e., parking) maneuver. In this case algorithms determining the relationship between the signal representative of the steering torque and motor generator torque are implemented in a speed sensitive manner for achieving high steering output forces with relatively low applied steering torque values. In FIG. 2C low and high speed motor pump operation is respectively depicted by curves 255a and 256a, and regenerative operation is depicted by curve 258a. For instance, when executing a parking motion nearly to the maximum steering deflection point, system fluid pressure values progressively increase along a curve 260a generally located between the curves 255a and 256a to a point 262a representative of a static value of steering force required for the completed parking motion. While holding the steering wheel at such a maximum deflection, the system fluid pressure value is nominally constant but the applied torque value is indeterminate along line 264a between points 262a and 263a located on curves 255a and 258a, respectively. Upon release of the steering wheel, the system fluid pressure follows curve 258a back toward nominal zero value as the pressure in the power cylinder is relieved.

Figure 3:
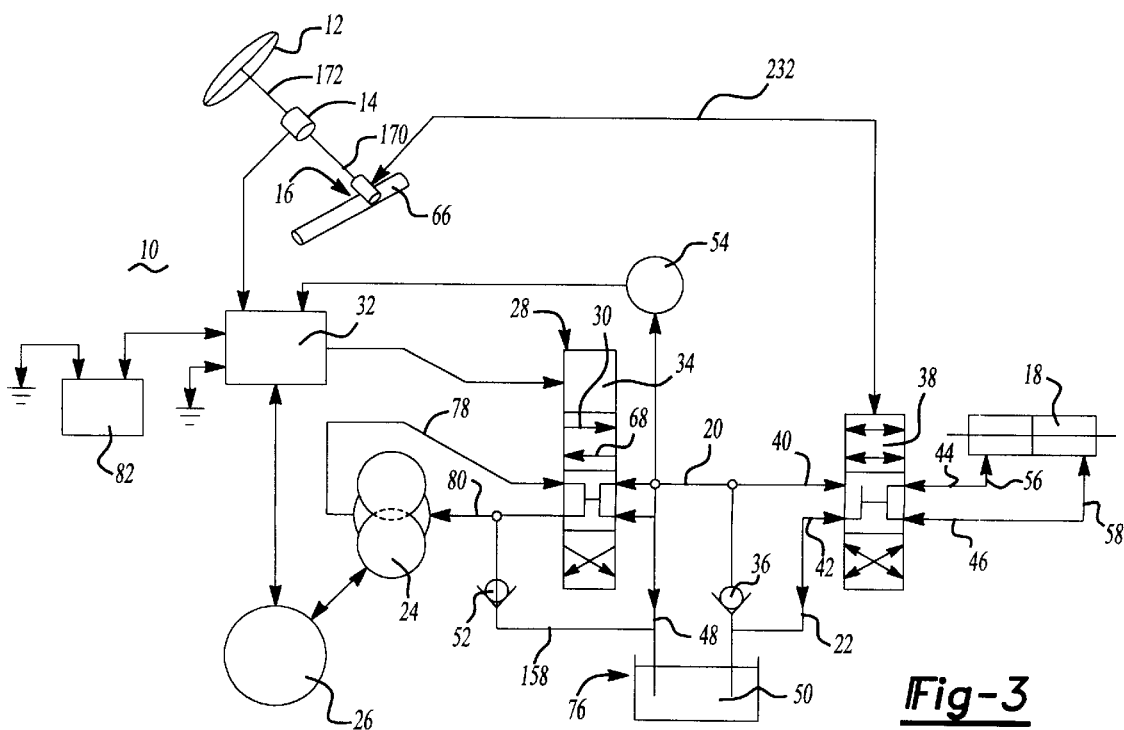
FIG. 3 is a schematic view of an alternate preferred embodiment of the present invention.

With reference to FIG. 3, a high-efficiency, regenerative, vehicle power steering system 10 according to an alternate preferred embodiment of the present invention is thereshown schematically, in conjunction with various constituents of the host vehicle in which the system 10 is located. The system 10 is employed with a steering wheel 12 movable by a driver for steering the dirigible (steerable) wheels (not shown) of the vehicle. As with system 240, the steering wheel 12 is connected to the dirigible wheels by a steering shaft 172 coupled to a suitable steering gear 16, for example, of the rack-and-pinion type, including a pinion shaft (not shown) contained in a steering gear housing 66 and engaged with a gear rack (also not shown). The torque transducer 14 is connected to the steering gear 16 and generates an electrical or electronic signal representative of the magnitude of the steering torque applied to the steering wheel 12.

Similarly to the system 240, the regenerative power steering system 10 of the present invention comprises a motor pump 24 having an outlet port 78 and an inlet port 80. However, in system 10 the outlet port 78 and an inlet port 80 are switchably and fluidly connected to the control valve assembly 38 by a switching means 28. The switching means 28 is described in detail below, and serves to switch the system 10 between the powered assist mode and an energy regeneration mode. As with system 240, the valve assembly 38 is fluidly connected to and controls actuation of a power cylinder 18. The power cylinder 18 again includes left and right ports 56 and 58 which allow selective fluid pressurization of either the left or the right side of the power cylinder 18. In the system 10, the outlet port 78 and the inlet port 80 of the motor pump 24 are switchably connected to the control valve assembly 38 by the switching means 28 via a fluid delivery line 20 and a reservoir structure 76. The control valve assembly 38 is again preferably a four-way underlapped closed-center valve having an inlet port 40 fluidly connected to the fluid delivery line 20 and an outlet port 42, this time fluidly connected to the reservoir structure 76. As with system 240, the differential pressure sensor 54 provides a signal representative of the difference between fluid pressure in the fluid delivery line 20 and the reservoir structure 76.

During the powered assist mode of the system 10, the control valve assembly 38 selectively fluidly connects the fluid delivery line 20 to the left or right port 56 or 58 of the power cylinder 18 through the left or right control port 44 or 46 of the control valve assembly 38, respectively, depending upon the desired direction of steering assist. During the energy regeneration mode of the system 10, the valve assembly 38 continues to connect the fluid delivery line 20 to the same port 56 or 58 to which the fluid delivery line 20 was connected during the powered assist mode of the system 10, even though fluid connection through the four-way cross-over valve 30 has been reversed. In FIG. 3, the valve assembly 38 is shown in a neutral position corresponding to the unassisted, straight steering mode. Because the valve assembly 38 is underlapped, in its neutral position it results in fluidly connecting all of the fluid delivery line 20, the reservoir structure 76 and the left and right ports 56 and 58 of the power cylinder 18 to one another. This enables non-pointing behavior of the system 10 when installed in the host vehicle during the unassisted, straight steering mode. Underlapping of the valve assembly 38 also provides tactile feedback to the vehicle driver during operation of the system 10 in the straight steering mode. In general, the valve assembly 38 is moved from its neutral position via the application of torque to the steering wheel 12 during the powered assist and energy regeneration modes of the system 10, depending upon the directions of vehicle turn and steering wheel motion.

As mentioned above, the power steering system 10 of the present invention also comprises the means 28 for switching the system 10 between the powered assist mode and the energy regeneration mode. The switching means 28 first comprises a four-way, underlapped, closed-center cross-over valve 30 positioned across both the fluid delivery line 20 and reservoir structure 76, between the control valve assembly 38 and the outlet and inlet ports 78 and 80 of the motor pump 24. The four-way cross-over valve 30 is operable between at least first and second operating positions associated with the powered assist and energy regeneration modes of the system 10, respectively. The four-way cross-over valve 30 is also preferably operable in a neutral position, shown in FIG. 3, associated with an unassisted, straight steering mode of the system 10. Since the four-way cross-over valve 30 is underlapped, in this neutral position it eases the switching action between the powered assist and energy regeneration modes, by enabling a momentary fault during switching. During this fault, the four-way cross-over valve 30 fluidly connects all of the motor pump outlet port 78, the motor pump inlet port 80, the fluid delivery line 20 and the reservoir structure 76 to one another. This fault lasts for less than about 5 milliseconds in normal operation of the system 10. Perhaps more importantly, however, biasing of the four-way cross-over valve 30 (in a manner described in more detail below) to its neutral position enables manual steering of the system 10 in case of failure of the system 10, for example, upon failure of the motor generator 26 or the motor pump 24. This fault obviates back driving of the motor generator 26, via the motor pump 24 under a steering torque applied to the steering wheel 12, during system failure.

In the first position of the four-way cross-over valve 30, that is, the position associated with the powered assist mode of the system 10, the four-way cross-over valve 30 is moved downwards from the neutral position shown in FIG. 3 so that the four-way cross-over valve 30 fluidly connects the motor pump outlet port 78 to the fluid delivery line 20, and fluidly connects the motor pump inlet port 80 to the reservoir structure 76. In the second position of the four-way cross-over valve 30, associated with the energy regeneration mode of the system 10, the four-way cross-over valve 30 is moved upwards from the position shown in FIG. 3, so that the four-way cross-over valve 30 fluidly connects the motor pump outlet port 78 to the reservoir structure 76, and fluidly connects the motor pump inlet port 80 to the fluid delivery line 20. This action by the four-way cross-over valve 30 allows the motor pump 24 to rotate in only a single direction during both the powered assist and energy regeneration modes of the system 10.

The mode-switching means 28 preferably also comprises a solenoid 34, preferably a centering, push-pull, double actuated solenoid. The solenoid 34 is operatively connected to the four-way cross-over valve 30 for moving the valve 30 between its first and second operating positions, and for returning the valve 30 to its neutral or open center position in the absence of any actuating signal corresponding to the powered assist or energy generation modes of the system 10.

Although they might be considered as somewhat arbitrary, the designations of the fluid line 20 as the "delivery" line and of the structure 76 as the "reservoir" structure, and of the motor pump ports 78 and 80 as "outlet" and "inlet," can clearly be understood as convenient, since they are associated with the single direction of rotation and the associated preferred direction of fluid flow through the motor pump 24 during the powered assist mode of the system 10. Moreover, it is the reservoir structure 76 which serves as the source of the fluid needed for operation of the system 10.

The fluid supplied by the reservoir structure 76 and employed in the system 10 can be any conventional power steering or hydraulic fluid, and is supplied from the fluid reservoir 50 which is incorporated in the reservoir structure 76. In addition to the reservoir 50, the reservoir structure 76 preferably further comprises the fluid return line 22 which fluidly connects the control valve assembly 38 to the fluid reservoir 50; a suction line 48 which fluidly connects the four-way cross-over valve 30 to the fluid reservoir 50; and a check valve 52 disposed in parallel with the suction line 48 (and a suction port 68 of the four-way cross-over valve 30), oriented so as to prevent cavitation of the motor pump 24 during the powered assist mode of the system 10. The motor pump 24 is not the only location in the system 10 which might be subject to cavitation during operation of the system 10, however. Conveniently, the system 10 can include a check valve 36 fluidly connected to the fluid delivery line 20 and the fluid return line 22, disposed in parallel with the control valve assembly 38. The check valve 36 is oriented so that it is closed when the pressure of the fluid in the fluid delivery line 20 is greater than the pressure of the fluid in the fluid return line 22, and open when the reverse is true. This prevents cavitation in the fluid delivery line 20 whenever the control valve assembly 38 is actuated abruptly, as during emergency maneuvering of the vehicle.

As in system 240, the regenerative power steering system 10 of the present invention next comprises a motor generator 26 operatively connected to the motor pump 24. However, because of the reversed arrangement of the fluid connections made by the four-way cross-over valve 30 during the energy regeneration mode of the system 10, the motor generator 26 is additionally capable of generating power recovered from the motor pump 24 in response to returning forces generated by the dirigible wheels of the host vehicle.

The system 10 of the present invention preferably comprises an electronic control means 32 which operates various parts of the system 10 in cooperation with one another. For example, in addition to controlling the motor generator 26, the electronic control means 32 preferably coordinates movement of the four-way cross-over valve 30 between its first and second positions, and thus, suitable connection of the motor generator 26 to the electrical power storing and delivering means 82 in response to powered assist and regeneration modes of the system 10. Thus, in the power steering system 10 the electrical power storing and delivering means 82 is enabled for receiving regenerative power in the regenerative mode.

As in system 240, the system 10 preferably generates signals representative of the torque applied by the motor generator 26 to the motor pump 24, and representative of the fluid pressure in the delivery line 20. In this case however, the electronic control means 32 preferably actuates the solenoid 34 in response to the polarity of the difference between the signals representative of the torque applied by the motor generator 26 to the motor pump 24 and the fluid pressure in the fluid delivery line 20, the signals being normalized in a manner described below.

The way in which the motor pump 24 recovers energy during operation of the system 10 can now be readily understood. When the host vehicle incorporating the system 10 starts to exit a turn, the applied steering torque is reduced. However, recoverable energy still exists in the system 10, for example, from residual system pressure (pressure in the power cylinder 18) still generated by the dirigible wheels of the vehicle as it exits from the turn. This tends to drive the power cylinder 18 in a direction which is the reverse of that in which it was moved by the valve assembly 38 during entry into the turn.

The electronic control means 32 responds to the polarity of the difference between the signals representing the torque applied by the motor generator 26 to the motor pump 24 and the fluid pressure in the fluid delivery line 20, and moves the four-way cross-over valve 30 to its second, cross-over position associated with the energy regeneration mode. This allows a flow of regenerative power from the power cylinder 18 and to the motor pump 24, and therefore a flow of regenerative power to be recovered by the motor generator 26.

As indicated above, in both the powered assist and energy regeneration modes the motor pump 24 always operates in the same direction, corresponding to the flow of fluid during the powered assist mode of the system 10. The flow of fluid through the motor pump 24 will be the same in both modes all of the time, even when fluid flow through the fluid delivery line 20 reverses, save perhaps for a small reverse flow which ensures that the motor pump 24 comes to a complete stop when appropriate.

Figure 8A:
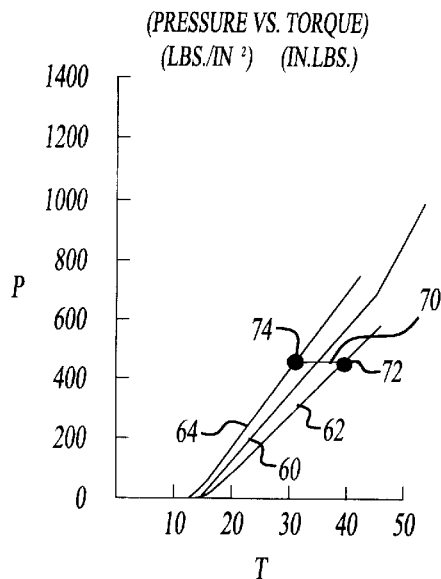
FIG. 8A is a graphic representation of the pressure-effort curve experienced during operation of the alternate preferred embodiment of the present invention.

The envelope of pressure-effort curves experienced by the system 10 during use are graphically depicted in FIG. 8A. The curves show the system pressure P in the fluid delivery line 20 (in lbs./in.$^2$) as a function of the applied steering torque T (in in.-lbs.), for example, applied to the pinion shaft 66 of the steering gear 16. Curve 60 indicates a modeled, theoretical operation of the system 10 in a vehicle turn, based upon an ideal 100 % mechanical efficiency of the motor pump 24. Curve 62 indicates actual operation of the system 10 during entry of the vehicle into a turn, and curve 64 indicates actual operation of the system 10 upon exit of the vehicle from a turn. Curves 62 and 64 differ from curve 60 because of the finite efficiency of the motor pump 24. Curves 62 and 64 are thereby associated with the powered assist and regenerative modes of the system 10, respectively. Of course, the slopes of the curves 60, 62 and 64 would of course be modified as a function of vehicular speed in order to make the system 10 speed sensitive, the slopes flattening at higher vehicle speeds. However, the slopes shown can be considered representative of operation of the system 10. Moreover, the curves 60, 62 and 64 represent the absolute values associated with the application of torque in either direction.

Since the motor generator 26 is preferably an induction motor under vector control, its speed is known at all times. Therefore, it is possible to separately determine the current values applied to generate field and torque in the motor generator 26. The electronic control means 32 causes the resulting torque to mimic the curve 60. The values required for curve 60 are determined in real time, and are a function of a plurality of selected software algorithm inputs, which can include vehicle yaw rate and/or lateral acceleration. In general, the curve 60 is a function of the torque sensed by the torque transducer 14 and vehicle speed. Any time the torque T is less than that required to enter any of the curves 60, 62 or 64, the system 10 is in the "straight motoring" mode; that is, the system 10 is in neither the powered assist nor the energy regeneration mode. This is true even if the steering wheel 12 is moving.

When entering a turn, the value of the system pressure progresses along the system pressure curve 62 to a point 72 representative of a system pressure able to generate steering force required for the turn. While the vehicle is in the turn, and the steering wheel 12 and the power cylinder 18 are stationary, the system fluid pressure is nominally constant, but the applied torque value is indeterminate along line 70 between points 72 and 74 located on curves 62 and 64, respectively. When exiting the turn, the applied torque follows curve 64 back towards a nominal zero value as the vehicle recovers from the turn. This is due to the finite efficiency of the motor pump 24 mentioned above.

The system 10 employs the signals representing the torque T and the pressure P in a straightforward manner. The voltages of the two signals are selected or adjusted so as to be normalized, that is, so that the signal voltages corresponding to values of the torque T and pressure P which lie on the look-up curve 60 are identical in magnitude and polarity. The system 10 then compares the signals representative of the torque applied by the motor generator 26 to the motor pump 24 and of the fluid pressure in the fluid delivery line 20, and actuates the switching means 28 in response to the polarity of the respective difference (T less P) between the signals, moving the four-way cross-over valve 30 to its appropriate position. Specifically, when the voltage of the signal representing the pressure P is less than the voltage of the signal representing the torque T, the polarity of their difference is positive, and the four-way cross-over valve 30 is moved to its first position, associated with the powered assist mode of the system 10. On the other hand, when the voltage of the signal representing the pressure P is greater than the voltage of the signal representing the torque T, the polarity of their difference is negative, and the four-way cross-over valve 30 is moved to its second position, associated with the energy regeneration mode of the system 10. In short, the system 10 uses the polarity of the respective difference between the signals to determine the actual operating state of the system 10 (that is, which of the curves 62 or 64 the actual pressure P and torque T values are on) and then selects the appropriate mode for the system 10 to operate in.

A detailed listing of various system parameters encountered during all possible conditions of operation of the system 10 of the present invention would be tedious and unnecessarily time-consuming. Instead, an appreciation of the way in which various system parameters are related can be best illustrated by considering a worst-case scenario for operation of any power steering system, in which the steering wheel 12 is so rapidly rocked back and forth repeatedly that a conventional system would "pump catch," that is, momentarily fail to respond to a torque applied to the steering wheel 12. FIGS. 8B–8K disclose a variety of system parameters encountered in the power steering system 10 of the present invention during operation in this worst-case scenario. More particularly, each of FIGS. 8B–8K show a particular system parameter as a function of time (in sec.) during a single one of several repeated cycles of rapid rocking of the steering wheel. For clarity of presentation and ease of understanding the principles of the present invention, the parameter values shown in FIGS. 8B–8K are idealized and based on several presumptions, including that the idealized system 10 has 100 percent efficiency and that the relationships between the various parameters are linear. The numerical values for the individual parameters should be considered representative of those parameters, rather than precise measurements of them. Indeed, some of them disclose not a specific parameter of interest, but instead disclose a parameter related to a specific parameter of interest.

Figure 8B:
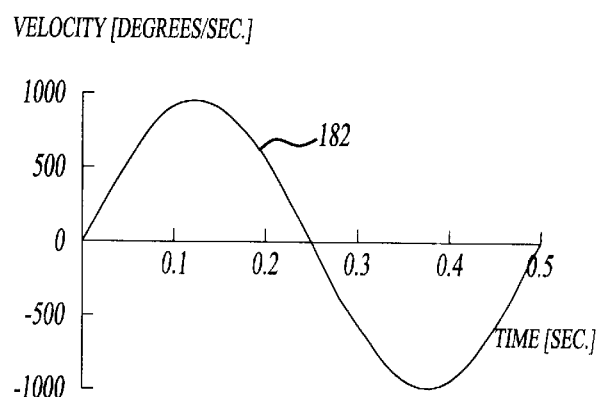
FIGS. 8B–8K are graphic representations of various characteristics experienced during operation of the alternate preferred embodiment of the present invention during a hypothetical, worst-case scenario.

FIG. 8B discloses the steering wheel rotational velocity in degrees per second, designated as curve 182. Rotation in a clockwise direction, that is, turning the steering wheel 12 to the right, is designated as a positive rotational velocity, while rotation in the counterclockwise or left direction is designated as a negative rotational velocity. The single cycle represented in FIGS. 8B–8K is approximately one half second long; since the steering wheel velocity will be zero at the extremes of travel, and a maximum at the center position of the steering wheel 12, the following relationship between time and the mode of operation of the system 10 should be evident, with the position of the steering wheel 12 at time 0.000 sec. being full counterclockwise or full left:

| Time (sec.) | Turn direction | Mode |
| --- | --- | --- |
| 0.000–0.125 | Right | Energy regeneration |
| 0.125–0.250 | Right | Powered assist |
| 0.250–0.375 | Left | Energy regeneration |
| 0.375–0.500 | Left | Powered assist |

Figure 8C:
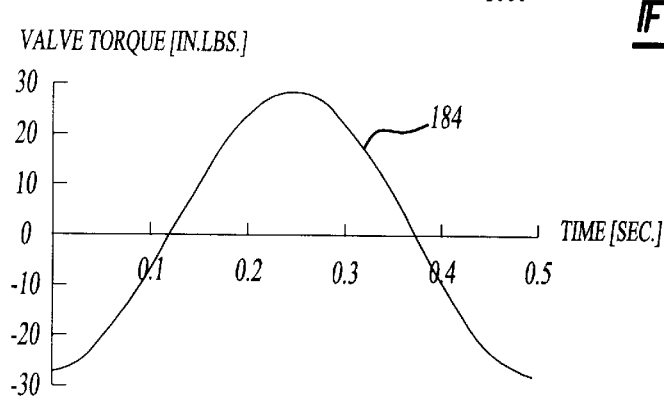

The switching between modes achieved by the four-way cross-over valve 30 occurs at times 0.000 sec., 0.125 sec., 0.250 sec. and, 0.375 sec.; the switching at 0.500 sec. is the same switching as occurs at 0.000 sec. FIG. 8C discloses as curve 184, torque (in in.-lbs.) applied to the power cylinder control valve assembly 38 as a function of time, representative of the applied torque present at the lower end 170 of the steering shaft 172. The 90° difference in phase between the velocity curve 182 in FIG. 8B and the valve torque curve 184 in FIG. 8C is due to the fact that the load presented by the dirigible wheels has the characteristics of a spring. The applied steering torque at the steering wheel 12 may differ greatly from the valve torque (or applied torque present at the lower end 170 of the steering shaft 172) because of the inertia of the steering wheel 12.

Figure 8D:
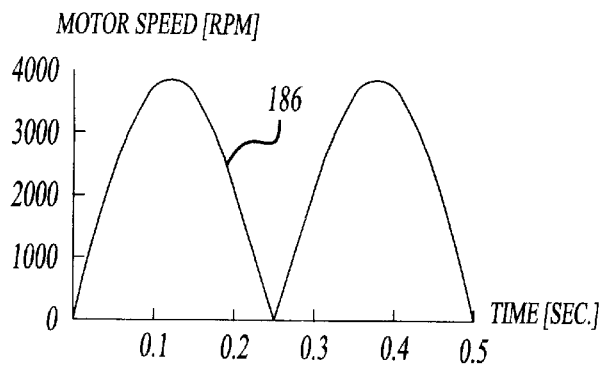
Figure 8E:
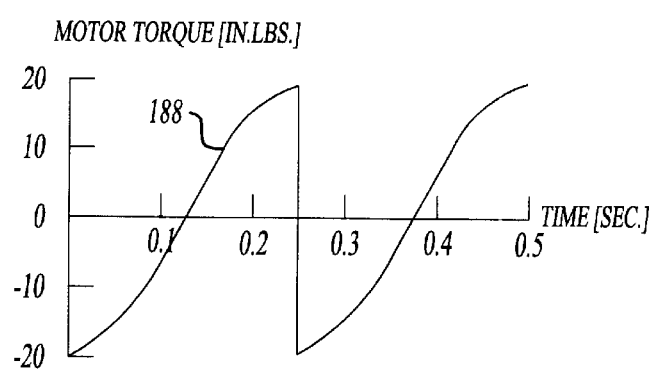
Figure 8F:
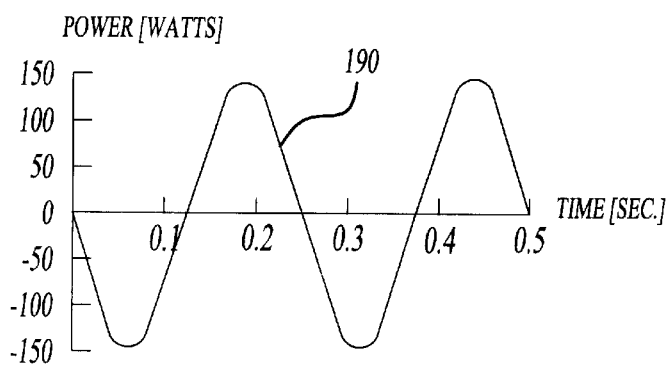

FIG. 8D shows as curve 186 the motor speed (in rpm) of the motor pump 24 as a function of time, while FIG. 8E shows as curve 188 the motor torque (in in.-lbs.) of the motor pump 24 as a function of time. The power used or recovered by the system 10 is, of course, the product of curves 186 and 188, that is, the product of the motor speed in FIG. 8D and the motor torque in FIG. 8E. This product is shown as curve 190 in FIG. 8F, as power (in watts) as a function of time, positive values of power being power required by the motor generator 26 for operation of the system 10 in the powered assist mode, and negative values of power being the power recoverable by the motor generator 26 during the energy regeneration mode of the system 10. The relative speed/torque requirements of the motor generator 26 are described in detail below.

Figure 8G:
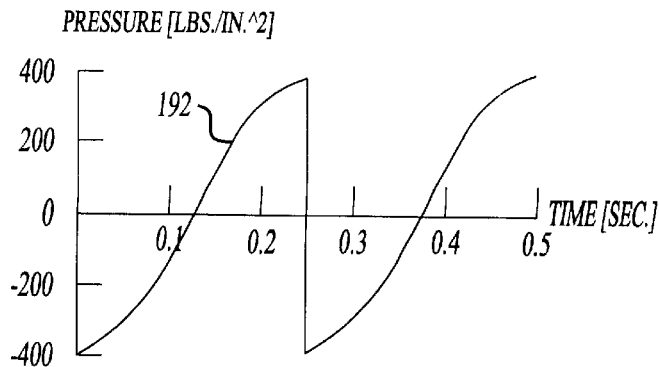
Figure 8H:
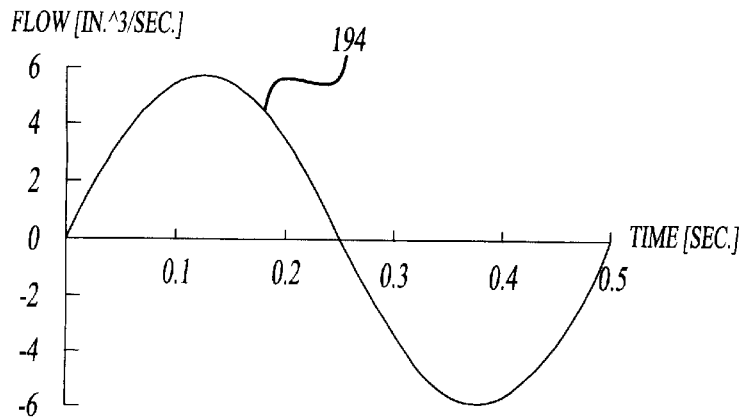
Figure 8I:
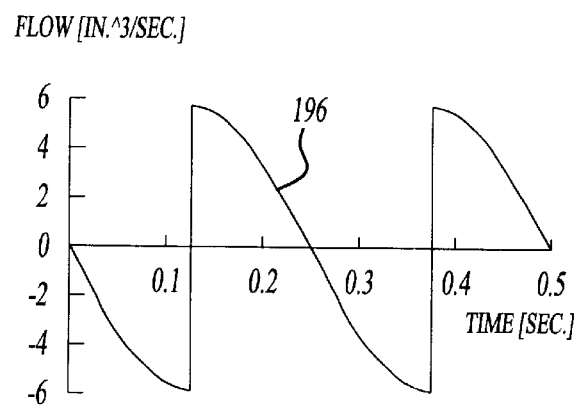
Figure 8J:
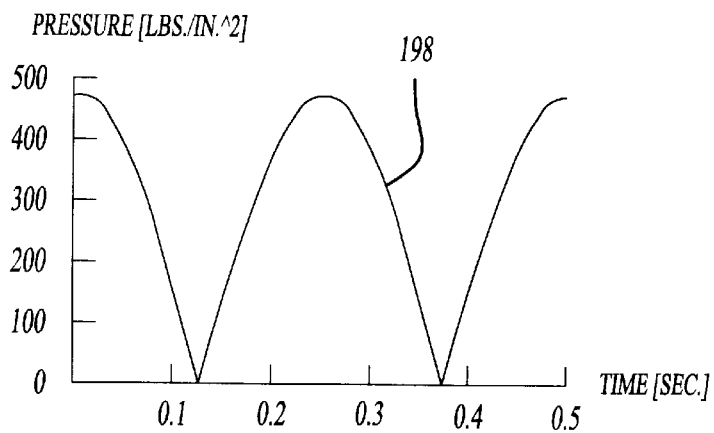
Figure 8K:
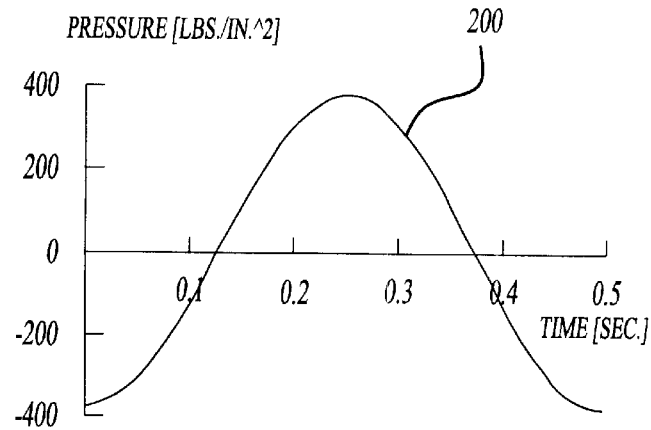

FIG. 8G discloses as curve 192 the pressure differential (in lbs./in.$^2$) across the outlet and inlet ports 78 and 80 of the motor pump 24 as a function of time. This pressure differential is in phase with the motor torque curve 188 shown in FIG. 8E. FIG. 8H discloses as a function of time the fluid flow (in in.$^3$/sec.) through the power cylinder control valve assembly 38, designated as curve 194. A positive flow moves the power cylinder 18 to the right, corresponding to a right turn, while a negative flow moves the power cylinder to the left, corresponding to a left turn. FIG. 8I discloses as curve 196 the system fluid flow (in in.$^3$/sec.) as a function of time, represented by the fluid flow through the fluid delivery line 20 connecting the four-way cross-over valve 30 to the power cylinder control valve assembly 38. This fluid flow has a positive value for fluid flow from the four-way cross-over valve 30 to the control valve assembly 38, and a negative value for fluid flow in the opposite direction. FIG. 8J discloses as curve 198 the pressure (in lbs./in.$^2$) in the delivery line 20 as a function of time. Finally, FIG. 8K discloses as curve 200 the pressure differential (in lbs./in.$^2$) across the left and right control ports 44 and 46 of the control valve assembly 38.

It should be noted that the vertical portions of the curve 196 in FIG. 8I are two of the locations at which the four-way cross-over valve 30 is actuated and moved between its energy regeneration and powered assist positions. These correspond to two of the zero motor torque and zero pressure differential values shown in FIGS. 8E and 8G, respectively. However, this also corresponds to maximum value of the fluid flow as shown in FIG. 8H and the motor speed as shown in FIG. 8D. Underlapping of the four-way cross-over valve 30 smooths the switching event occurring at these two locations. The other two switching locations are those where the value of the flow is zero. (In the system 10 as disclosed, these latter two switching locations also happen to correspond to the failure mode of the system 10, that is, failure of the motor pump 24. Underlapping of the four-way cross-over valve 30 also enables manual steering at these locations.)

Perhaps the most important implication of the data contained in FIGS. 8B–8K is that even in this worst-case scenario of rocking the steering wheel 12, a rocking which could cause conventional power steering systems to "pump catch," the power steering system 10 of the present invention remains fully operable.

Figure 9:
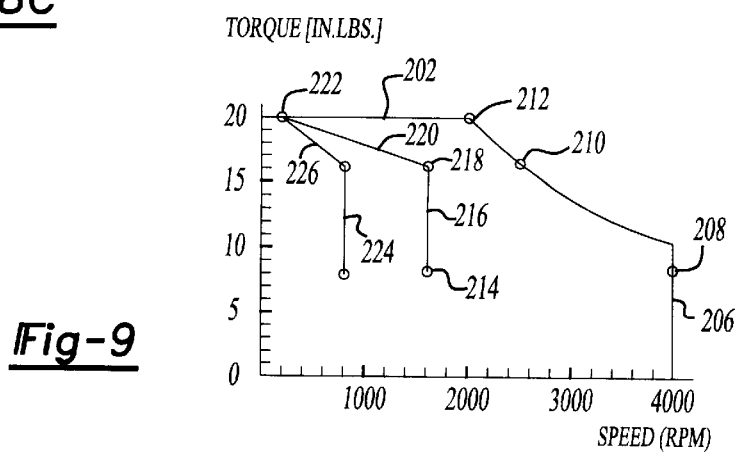
FIG. 9 is a graphic representation of power consumption during use of either of the preferred and alternate preferred embodiments of the present invention, in general comparison to the power consumption during use of prior EHPS systems.

FIG. 9 is a graphical representation diagram depicting the relative speed/torque requirements during identical parking maneuvers of a drive motor comprised in a prior art EHPS system and the motor generator 26 of similarly sized power steering systems 10 and 240 of the present invention. In this example both motors are of the field weakening type. Identical maximum motor performance envelopes are depicted in FIG. 9 by line 202, which depicts maximum torque (in a steady state) in in.-lbs.; hyperbolic curve 204, which depicts maximum power; and line 206, which depicts maximum speed in rpm. Generally, the motor of the prior art EHPS system operates somewhere along the line 206 or hyperbolic curve 204 as determined by a nominally linear relationship between system pressure and motor torque. In both the prior EHPS system and in the systems 10 and 240 of the present invention, the maximum torque is proportional to the maximum allowed system pressure. In the present systems 10 and 240, however, the instant torque/speed operating points of the motor generator are precisely determined.

A typical parking maneuver for a prior art EHPS system might be one that starts on-center at an operating point 208, corresponding to full speed and about 40% torque for the drive motor of the prior art EHPS system. As tie rod and knuckle arm geometry become less favorable, a locus of instant operating points follows line 206 and hyperbolic curve 204 to maximum steering deflection operating point 210. Then, assuming that the driver forcibly holds the steering system at its end point or stop, the locus of instant operating points follows hyperbolic curve 204 to maximum power and torque operating point 212 where it remains as long as the driver continues to apply torque.

With the power steering systems 10 and 240 of the present invention, on the other hand, a parking maneuver at 400 degrees per second steering wheel velocity that similarly starts on-center could begin at an operating point of about 40% of full speed and about 40% torque for the motor generator 26, as depicted by point 214. As the tie rod and knuckle arm geometry become less favorable, a locus of instant operating points follows line 216 to maximum steering deflection operating point 218. Then, assuming that the driver forcibly holds the steering system at its end point or stop, the locus of instant operating points follows curve 220 to maximum torque operating point 222 where it remains as long as the driver continues to apply torque. The motor speed indicated by the location of maximum torque operating point 222 is vanishingly small since, as mentioned above, all of the fluid delivered by the motor pump 24 passes through the power cylinder 18, save for any leakage in the systems 10 and 240.

A comparison of the relative rotational motor speeds required by the different systems in performing the same parking maneuver readily confirms the efficiency advantages of the power steering systems 10 and 240 of the present invention over the prior art EHPS system. Instant power requirements of the motor generator 26 relative to those of the drive motor of a prior art EHPS system are linearly related to the horizontal fraction of the distance to line 206 or hyperbolic curve 204 depicted by positions along line 216 or curve 220. Moreover, this fraction corresponds to the industry standard of 400 degrees per second steering wheel velocity during parking. A more normally seen steering wheel velocity of 200 degrees per second would proportionately reduce these instant power levels to those depicted by line 224 and curve 226. Overall, such a typical parking maneuver could be accomplished by the power steering systems 10 and 240 of the present invention with about one quarter to one third of the energy expended by the prior art EHPS system.

The power steering systems 10 and 240 of the present invention reduce energy consumption in other important ways. Prior power steering systems generally include an electric motor or fluid pump which operates a substantial fraction of the time the vehicle is in operation, without regard to the actual need for such operation. Most of the time, of course, a vehicle is traveling in a straight direction and does not need a powered assist to steering. The motors or pumps in the prior systems therefore uselessly consume energy during straight vehicle travel. In the systems 10 and 240 of the present invention, in contrast, the speed of the motor generator 26 and the motor pump 24 is zero during straight travel of the host vehicle, so that the present systems 10 and 240 avoid the energy consumption encountered in prior systems. Moreover, the present systems 10 and 240 are capable of delivering maximum power at the time it is most needed, that is, during parking maneuvers. Prior systems including a fluid pump driven by the engine of the vehicle deliver their least amount of fluid flow during parking maneuvers, when engine speed is low, and their maximum fluid flow when the vehicle is at high speeds, when the power needed for assisted steering is the least. As mentioned above, the system 10 of the present invention enjoys a regeneration of significant energy, still further reducing the net consumption of energy over that of prior steering systems.

The practical importance of such energy saving is simple to understand. It is highly desirable, especially for passenger cars, that the power needed for operation of an electro-hydraulic power steering system be drawn from only the vehicle alternator and not from both the alternator and the vehicle battery. The amperage limit of the alternator thus limits the energy available. For example, a prior EHPS system might require an average 5 amperes of current draw if employed in a small car, and perhaps an average 10 to 12 amperes if employed on a large luxury car. While a 5 ampere current draw might be acceptable on a small car, a 10 to 12 ampere current draw is probably unacceptable on a larger car, in view of the current draw required for the remainder of the vehicle, and in view of the fact that the maximum current draw (for example, during parking the host vehicle) might be as much as 60 amperes for a small car and about 120 to 144 amperes for a large car. This latter amperage is beyond the capacity of the alternators normally installed in automobiles.

The power steering systems 10 and 240 of the present invention, in contrast, can be employed on a large luxury car while drawing an average of only about 2 to 3 amperes. This is about the same current draw as that required by only the solenoid of a speed sensitivity control apparatus utilized in some prior systems and is quite modest. During parking maneuvers for a large car, the maximum draw of the systems 10 and 240 is only about 80 to 96 amperes, just within the capacity of conventional alternators. The systems 10 and 240 of the present invention could therefore be employed on host vehicles substantially larger than those utilizing prior EHPS systems. Even so, the host vehicle would preferably include a solid state power shedding control to selectively reduce the current draw of those other parts of the vehicle during parking, such as the back light, heater blowers, radiator fans and the like.

In practice, it would be very convenient and highly preferable to save space in the engine compartment of the host vehicle, and to save vehicle assembly costs, by combining a substantial number of the elements of the power steering system 10 into a power pack 84 to be installed on the host vehicle. ("Power pack" is a term of art in the automotive industry, referring to a single integrated unit which combines a motor and a pump.) As shown in FIGS. 4 through 7, in a particularly preferred arrangement the power pack 84 can include the motor generator 26, the motor pump 24, the four-way cross-over valve 30, the solenoid 34, the check valve 52 and the pressure sensor 54. The power pack 84 could then be mounted in the host vehicle at any convenient location in a mechanically isolated manner, and connected to the remaining elements of the system 10 by suitable electrical and fluid connections. Of course, other elements of the systems 10 and 240 may be combined in a similar manner; for example, the steering torque transducer 14 and the control valve assembly 38 may be combined in, or on, the housing of the pinion shaft 66 and rack 68 of the steering gear 16. The particular arrangement of the power pack 84 and the specific construction of the elements combined in it are believed not to be critical to the regenerative power steering system 10 as disclosed above, although they may of course permit the system 10 to enjoy further unexpected advantages over prior power steering devices.

In the preferred power pack 84, the motor generator 26 includes a stator 86 surrounding a rotor 88, the rotor 88 having a shaft 92 rotatably mounted to an end bell 144 of the motor generator 26 by a bearing 90. The end bell 144 also serves as one end plate of the motor pump 24. A fluid seal 100 is provided in the end bell 144 encircling the rotor shaft 92. The end 94 of the shaft 92 extends through the seal 100 and is joined by an Oldham coupling 156 to an input shaft 102 of the motor pump 24. The Oldham coupling 156 comprises a flat, circular metallic disk 174 having a cross-shaped slot 176 for engaging a flat tang 106 on an end 104 of the pump input shaft 102 and a pair of flat tabs 96 formed on an end 94 of the motor rotor shaft 92. The tang 106 is received in a slot 98 defined between the tabs 96.

The motor pump 24 includes an idler shaft 108 disposed in parallel with the input shaft 102. The input shaft 102 and idler shaft 108 carry on them a pair of mutually engaged input and idler gears 110 and 112, respectively, contained within the body 142 of the motor pump 24. The input and idler shafts 102 and 108 are rotatably disposed in suitable bearing blocks designated generally as 228 and 230. (The bearing blocks 228 and 230 for the idler shaft 108 can be, but need not be, identical to the bearing blocks 228 and 230 for the input shaft 102.) In the conventional manner, rotation of the input shaft 102 causes the input gear 110 to drive the idler gear 112, thereby pumping fluid through the motor pump 24 out the pump outlet port 78. The motor pump body 142 includes a bypass bore 158 containing the check valve 52 in it, as well as a pressure balancing port 148 for the application of pressure to the shoulders 234 of the bearing blocks 228 within the motor pump 24.

The four-way cross-over valve 30 is mounted to the motor pump 24. The four-way cross-over valve 30 first comprises a housing 150 which also serves as the other end plate of the motor pump 24, opposite the end bell 144. The four-way cross-over valve 30 also comprises a valve body 114 threadably received in the solenoid 34 and further received in a longitudinal bore 162 in the valve housing 150. The valve body 114 has a longitudinal bore 118 receiving a valve spool 116 therein. The solenoid 34, in turn, is threadably mounted to the valve housing 150 and comprises a solenoid body 122 containing a plunger 126 surrounded by a pair of solenoid coils 124. The plunger 126 includes a pair of conical portions 128, shaped to mate with interior conical surfaces 180 on pole pieces 178 associated with each of the solenoid coils 124, for increasing the actuating force which is applied to the plunger 126. The conical portions 128 of the plunger 126 also ensure precise positioning of the plunger 126 with respect to the particular one of the solenoid coils 124 energized. A narrow, extended end 130 of the plunger 126 abuts the valve spool 116 for moving the valve spool 116 upon actuation of the solenoid 34. The valve spool 116 is biased against the end 130 of the plunger 126 by a relatively long, and therefore compliant, spring 120 disposed between a shoulder 160 on the valve spool 116 and the bottom of the bore 162 in the valve housing 150.

Upon actuation of the solenoid 34, the plunger 126 moves only a very short distance, on the order of one millimeter. Accordingly, it is very desirable that the position of the valve spool 116 with respect to the valve body 114 be adjustable with a good degree of precision, so as to ensure alignment of the valve spool 116 with the inlet and outlet ports 152 and 154 of the valve 30 and enable proper operation of the four-way cross-over valve 30 and prevent any unintended fluid connections when the valve 30 is in its neutral position (in neither the powered assist nor the power generating mode). This adjustment can be carried out with a very straightforward mechanism. A counterbore 134 is formed in an end 132 of the plunger 126 opposite the extended end 130. A relatively short, and therefore stiff, spring 136 is received in the counterbore 134 and is trapped against the closed end 138 of the solenoid body 122. An adjustment screw 140 is threaded through the closed end 138 of the solenoid body 122 and abuts the short spring 136. Rotation of the adjustment screw 140 precisely controls compression of both springs 120 and 136. Since the relatively short spring 136 is stiff, such control over the compression of both springs 120 and 136 allows a very precise adjustment of the position of the valve spool 116 with respect to the valve body 114, and thereby with respect to the inlet and outlet ports 152 and 154 of the valve 30. Use of the compliant, long spring 120 ensures that a relatively constant biasing force value of the valve spool 116 is exerted upon the extended end 120 of the plunger 126. This ensures that the valve spool 116 will faithfully follow the axial position of the end 130 of the plunger 126.

The valve housing 150 also preferably includes a suction port 164 to be placed in fluid communication with the fluid reservoir 50, and a delivery port 166 to be placed in fluid communication with the fluid delivery line 20. The valve housing preferably further includes a tap 168 to which the pressure sensor 54 is connected, and more preferably, in which the pressure sensor 54 is threadably mounted. All of these connections, as well as the connection of all of the elements of the power pack 84, can be made using standard fittings or otherwise made in any suitable, conventional manner.

Again, the regenerative power steering systems of the present invention have many advantages over prior power steering systems. The systems possess high efficiency, and in the case of the system 10, recover a significant portion of the energy returned from the dirigible wheels when the host vehicle exits a turn. The systems of the present invention draw significantly less current during parking maneuvers than is drawn by prior EHPS systems. The system 10 of the present invention can be switched sufficiently rapidly between its powered assist and energy regeneration modes to permit good steering control during both modes, and during changing between those modes. Similarly, the system 240 of the present invention can activate its dynamic braking feature rapidly in order to permit good steering control during powered assist and recovery modes, and during changing between those modes. Such switching is carried out with excellent smoothness. Finally, either system of the present invention allows safe operation of the vehicle during failure of the powered assist provided by that system.

Having described the invention, however, many modifications thereto will become immediately apparent to those skilled in the art to which it pertains, without deviation from the spirit of the invention. Such modifications fall within the scope of the invention.

INDUSTRIAL APPLICABILITY

The instant systems are capable of dynamic braking or regenerating and recovering a substantial amount of the energy developed in vehicle power steering systems, and accordingly find industrial application in motor vehicles and other devices having a powered assist generated as a function of applied torque.

I claim:

1. A regenerative power steering system (10) for a vehicle, alternatively operable in an unassisted, straight steering mode, a powered assist mode which provides a powered assist to entry of the vehicle into a turn and an energy regeneration mode which recovers energy while the vehicle exits a turn; wherein the system (10) employs a fluid, and wherein the system (10) comprises:

a power cylinder (18);

a valve assembly (38) fluidly connected to and controlling actuation of the power cylinder (18);

a fluid delivery line (20) fluidly connected to the valve assembly (38);

a reservoir structure (76) fluidly connected to the valve assembly (38);

a motor pump (24) having an outlet port (78) and an inlet port (80);

means (28) for switching the system (10) between the straight steering, powered assist and energy regeneration modes, comprising a four-way cross-over valve (30) operable between: (a) a first position associated with the powered assist mode of the system (10), in which the four-way cross-over valve (30) fluidly connects the motor pump outlet port (78) to the fluid delivery line (20) and fluidly connects the motor pump inlet port (80) to the reservoir structure (76); and (b) a second position associated with the energy regeneration mode of the system (10), in which the four-way cross-over valve (30) fluidly connects the motor pump outlet port (78) to the reservoir structure (76) and fluidly connects the motor pump inlet port (80) to the fluid delivery line (20); and a motor generator (26) operatively connected to the motor pump (24), the motor generator (26) driving the motor pump (24) so as to provide a flow of pressurized fluid to the valve assembly (38) and the power cylinder (18) during the powered assist mode of the system (10), and the motor generator (26) generating energy recovered through the motor pump (24) during the power regeneration mode of the system (10).

2. The power steering system (10) according to claim 1, further comprising a means (82) for storing and delivering electrical energy, and an electronic control means (32) for coordinating (a) movement of the four-way cross-over valve (30) between its first and second positions and (b) connection of the motor generator (26) to the electrical energy storing and delivering means (82), in a manner so that electrical energy is delivered from the electrical energy means (82) to the motor generator (26) during the powered assist mode of the system (10), and is stored to the electrical energy means (82) by the motor generator (26) during the energy regeneration mode of the system (10).

3. The power steering system (10) according to claim 1, wherein the switching means (28) further comprises a solenoid (34) operatively connected to the four-way cross-over valve (30).

4. The power steering system (10) according to claim 3, wherein the solenoid (34) is a centering, push-pull, double actuated solenoid.

5. The power steering system (10) according to claim 1, wherein the system (10) generates signals representative of the torque applied by the motor generator (26) to the motor pump (24) and the fluid pressure in the fluid delivery line (20), and wherein the system (10) further comprises an electronic control means (32) for actuating the switching means (28) in response to the polarity of the difference between the signals representative of the torque applied by the motor generator (26) to the motor pump (24) and the fluid pressure in the fluid delivery line (20).

6. The power steering system (10) according to claim 1, wherein the reservoir structure (76) comprises a fluid reservoir (50) and a fluid return line (22) fluidly connecting the valve assembly (38) to the fluid reservoir (50); and wherein the system (10) further comprises a check valve (36) fluidly connected to the fluid delivery line (20) and the fluid return line (22) and disposed in parallel with the valve assembly (38), the check valve (36) being closed when the pressure of the fluid in the fluid delivery line (20) is greater than the pressure of the fluid in the fluid return line (22) and being open when the pressure of the fluid in the fluid return line (22) is greater than the pressure of the fluid in the fluid delivery line (20), thereby preventing cavitation in the fluid delivery line (20) upon abrupt actuation of the valve assembly (38) controlling actuation of the power cylinder (18).

7. The power steering system (10) according to claim 1, wherein the reservoir structure (76) comprises a fluid reservoir (50), a suction line (48) fluidly connecting the four-way cross-over valve (30) to the fluid reservoir (50) and a check valve (52) disposed in parallel with the suction line (48), oriented so as to prevent cavitation of the motor pump (24) during the powered assist mode.

8. The power steering system (10) according to claim 1, wherein the four-way cross-over valve (30) is an underlapped, closed-center valve.

9. The power steering system (10) according to claim 8, wherein the four-way cross-over valve (30) is further operable in a neutral position between its first and second positions, associated with the straight steering mode of the system (10), in which the four-way cross-over valve (30) fluidly connects all of the motor pump outlet port (78), the motor pump inlet port (80), the fluid delivery line (20) and the reservoir structure (76) to one another.

10. The power steering system (10) according to claim 1, wherein the power cylinder (18) comprises a pair of ports (56 and 58) fluidly connectable to the valve assembly (38) for actuation of the power cylinder (18), and wherein the valve assembly (38) is an underlapped, closed-center, four-way valve, operable in a neutral position associated with the straight steering mode of the system (10), in which the valve assembly (38) fluidly connects all of the fluid delivery line (20), the reservoir structure (76) and the ports (56 and 58) of the power cylinder (18) to one another.

11. The power steering system (10) according to claim 1, wherein the motor pump (24) rotates in the same direction during substantial portions of both the powered assist and energy regeneration modes of the system (10).

12. The power steering system (10) according to claim 1, wherein the motor pump (24) and the motor generator (26) do not rotate during the straight steering mode of the system (10).

13. A regenerative power steering system (10) for a vehicle, alternatively operable in an unassisted, straight steering mode, a powered assist mode which provides a powered assist to entry of the vehicle into a turn and an energy regeneration mode which recovers energy while the vehicle exits a turn; wherein the system (10) employs a fluid, and wherein the system (10) comprises:

a power cylinder (18);

an underlapped, closed-centered, four-way valve assembly (38) fluidly connected to and controlling actuation of the power cylinder (18);

a fluid delivery line (20) fluidly connected to the valve assembly (38);

a reservoir structure (76) fluidly connected to the valve assembly (38);

a motor pump (24) having an outlet port (78) and an inlet port (80);

means (28) for switching the system (10) between the straight steering, powered assist and energy regeneration modes, comprising a four-way cross-over valve (30) and a centering, push-pull, double actuated solenoid operatively connected to the four-way cross-over valve (30), such that the four-way cross-over valve (30) is operable between: (a) a first position associated with the powered assist mode of the system (10), in which the four-way cross-over valve (30) fluidly connects the motor pump outlet port (78) to the fluid delivery line (20) and fluidly connects the motor pump inlet port (80) to the reservoir structure (76); and (b) a second position associated with the energy regeneration mode of the system (10), in which the four-way cross-over valve (30) fluidly connects the motor pump outlet port (78) to the reservoir structure (76) and fluidly connects the motor pump inlet port (80) to the fluid delivery line (20);

a motor generator (26) operatively connected to the motor pump (24), the motor generator (26) driving the motor pump (24) so as to provide a flow of pressurized fluid to the valve assembly (38) and the power cylinder (18) during the powered assist mode of the system (10), and the motor generator (26) generating energy recovered through the motor pump (24) during the power regeneration mode of the system (10), the system (10) generating signals representative of the torque applied by the motor generator (26) to the motor pump (24) and of the fluid pressure in the fluid delivery line (20);

a means (82) for storing and delivering electrical energy; and an electronic control means (32) for: (i) coordinating both (a) movement of the four-way cross-over valve (30) between its first and second positions, and (b) connection of the motor generator (26) to the electrical energy storing and delivering means (82), in a manner so that electrical energy is delivered from the electrical energy means (82) to the motor generator (26) during the powered assist mode of the system (10), and is stored to the electrical energy means (82) by the motor generator (26) during the energy regeneration mode of the system (10); and (ii) for actuating the solenoid (34) in response to the polarity of the difference between the signals representative of the torque applied by the motor generator (26) to the motor pump (24) and the fluid pressure in the fluid delivery line (20);

wherein the motor pump (24) rotates in the same direction during substantial portions of both the powered assist and energy regeneration modes of the system (10), and wherein the motor pump (24) and the motor generator (26) do not rotate during the straight steering mode of the system (10);

wherein the reservoir structure (76) comprises a fluid reservoir (50), a fluid return line (22) fluidly connecting the valve assembly (38) to the fluid reservoir (50), a suction line (48) fluidly connecting the four-way cross-over valve (30) to the fluid reservoir (50) and a check valve (52) disposed in parallel with the suction line (48), oriented so as to prevent cavitation of the motor pump (24) during the powered assist mode; and wherein the system (10) further comprises a check valve (36) fluidly connected to the fluid delivery line (20) and the fluid return line (22) and disposed in parallel with the valve assembly (38), the check valve (36) being closed when the pressure of the fluid in the fluid delivery line (20) is greater than the pressure of the fluid in the fluid return line (22) and being open when the pressure of the fluid in the fluid return line (22) is greater than the pressure of the fluid in the fluid delivery line (20), thereby preventing cavitation in the fluid delivery line (20) upon abrupt actuation of the valve assembly (38) controlling actuation of the power cylinder (18);

wherein the four-way cross-over valve (30) is further operable in a neutral position between its first and second positions, associated with the straight steering mode of the system (10), in which the four-way cross-over valve (30) fluidly connects all of the motor pump outlet port (78), the motor pump inlet port (80), the fluid delivery line (20) and the reservoir structure (76) to one another; and wherein the power cylinder (18) comprises a pair of ports (56 and 58) fluidly connectable to the valve assembly (38) for actuation of the power cylinder (18), and wherein the valve assembly (38) is further operable in a neutral position associated with the straight steering mode of the system (10), in which the valve assembly (38) fluidly connects all of the fluid delivery line (20), the reservoir structure (76) and the ports (56 and 58) of the power cylinder (18) to one another.

14. A method of controlling and regenerating energy in a power steering system (10) for a vehicle, the system (10) being alternatively operable in an unassisted, straight steering mode, a powered assist mode which provides a powered assist to entry of the vehicle into a turn and an energy regeneration mode which recovers energy while the vehicle exits a turn, and the system (10) employing a fluid; wherein the system (10) comprises a power cylinder (18), a fluid delivery line (20) switchably fluidly connected to the power cylinder (18), a motor pump (24) supplying a flow of pressurized fluid through the delivery line (20) and to the power cylinder (18) during the powered assist mode of the system (10), and a motor generator (26) operatively connected to the motor pump (24) so as to generate energy recovered from the motor pump (24) during the energy regeneration mode of the system (10); and wherein the method comprises the steps of:

generating normalized signals representative of the torque applied by the motor generator (26) to the motor pump (24), and of the fluid pressure in the fluid delivery line (20);

switching operation of the system (10) to the energy regeneration mode when the polarity of the respective difference between the signals is negative; and switching operation of the system (10) to the powered assist mode when the polarity of the respective difference between the signals is positive.

15. A power steering system (240) for a vehicle, alternatively operable in an unassisted, straight steering mode, a powered assist mode which provides a powered assist to entry of the vehicle into a turn and an returned energy dissipation mode which dissipates returning stored energy while the vehicle exits a turn; wherein the system (240) employs a fluid, and wherein the system (240) comprises:

a power cylinder (18);

a valve assembly (38) fluidly connected to and controlling actuation of the power cylinder (18);

a motor pump (24) having an outlet port (78) and an inlet port (80);

a fluid delivery line (20) fluidly connecting the outlet port (78) to the valve assembly (38);

a reservoir (50);

a suction line (21) fluidly connecting the reservoir (50) to the inlet port (80);

a fluid return line (22) fluidly connecting the valve assembly (38) to the reservoir (50);

dynamic braking means (244) for dissipating stored energy recovered from the power cylinder (18) during the returned energy dissipation mode, comprising a pressure balanced bypass valve assembly (246) operable between: (a) a closed position associated with the powered assist mode of the system (240); and (b) a modulated partially open position associated with the returned energy dissipation mode of the system (240), in which the pressure balanced bypass valve assembly (246) fluidly connects the fluid delivery line (20) to the fluid return line (22) in a selectably restricted manner; and a motor generator (26) operatively connected to the motor pump (24), the motor generator (26) driving the motor pump (24) so as to provide a flow of pressurized fluid to the valve assembly (38) and the power cylinder (18) during the powered assist-node of the system (240).

16. The power steering system (240) according to claim 15, further comprising a means (82) for storing and delivering electrical energy, and an electronic control means (242) for coordinating (a) movement of the pressure balanced bypass valve assembly (246) between its closed and modulated partially open positions and (b) connection of the motor generator (26) to the electrical energy storing and delivering means (82), in a manner so that electrical energy is delivered from the electrical energy means (82) to the motor generator (26) during the powered assist mode of the system (240), and is dissipated via the restricted passage of pressurized fluid through the pressure balanced bypass valve assembly (246) during the returned energy dissipation mode of the system (240).

17. The power steering system (240) according to claim 16, wherein the system (240) generates signals representative of the torque applied by the motor generator (26) to the motor pump (24) and of the fluid pressure in the fluid delivery line (20), and wherein the electronic control means (242) coordinates the movement of the pressure balanced bypass valve assembly (246) and the connection of the motor generator (26) to the electrical energy storing and delivering means (82) in response to the signals representative of the torque applied by the motor generator (26) to the motor pump (24) and of the fluid pressure in the fluid delivery line (20).

18. The power steering system (240) according to claim 17, wherein the electronic control means (242) causes the pressure balanced bypass valve assembly (246) to selectively permit the restricted passage of pressurized fluid through the pressure balanced bypass valve assembly (246) in response to the signal representative of the fluid pressure in the fluid delivery line (20) exceeding the signal representative of the torque applied by the motor generator (26) to the motor pump (24).

* * * * *